US009047589B2

(12) United States Patent
Gallant et al.

(10) Patent No.: US 9,047,589 B2
(45) Date of Patent: Jun. 2, 2015

(54) HIERARCHICAL PUBLISH AND SUBSCRIBE SYSTEM

(75) Inventors: John Kenneth Gallant, Plano, TX (US); Brad Verd, Herndon, VA (US); Karl M. Henderson, Dallas, TX (US)

(73) Assignee: VERISIGN, INC., Reston, VA (US)

( * ) Notice: Subject to any disclaimer, the term of this patent is extended or adjusted under 35 U.S.C. 154(b) by 445 days.

(21) Appl. No.: 12/610,066

(22) Filed: Oct. 30, 2009

(65) Prior Publication Data

US 2011/0106891 A1 May 5, 2011

(51) Int. Cl.
*G06F 15/16* (2006.01)
*G06Q 10/10* (2012.01)
*H04L 12/18* (2006.01)
*H04L 29/08* (2006.01)

(52) U.S. Cl.
CPC .......... *G06Q 10/107* (2013.01); *H04L 12/1854* (2013.01); *H04L 67/26* (2013.01)

(58) Field of Classification Search
CPC ... H04L 67/26; H04L 12/1854; G06Q 10/107
See application file for complete search history.

(56) References Cited

U.S. PATENT DOCUMENTS

| | | | |
|---|---|---|---|
| 6,202,093 B1 * | 3/2001 | Bolam et al. | 709/224 |
| 6,334,151 B1 | 12/2001 | Bolam et al. | |
| 6,336,119 B1 | 1/2002 | Banavar et al. | |
| 6,519,629 B2 | 2/2003 | Harvey et al. | |
| 6,578,066 B1 | 6/2003 | Logan et al. | |
| 6,829,230 B1 | 12/2004 | Tiuri | |
| 7,133,869 B2 | 11/2006 | Bryan et al. | |
| 7,280,999 B2 | 10/2007 | Chung et al. | |
| 7,310,686 B2 | 12/2007 | Uysal | |
| 7,406,537 B2 | 7/2008 | Cullen | |
| 7,546,368 B2 | 6/2009 | Drees et al. | |
| 7,631,101 B2 | 12/2009 | Sullivan et al. | |
| 7,685,270 B1 | 3/2010 | Vermeulen et al. | |
| 7,694,016 B2 | 4/2010 | Halley | |

(Continued)

FOREIGN PATENT DOCUMENTS

WO 2007078283 A2 7/2007

OTHER PUBLICATIONS

Birman et al., "Exploiting virtual synchrony in distributed systems," ACM SIGOPS Operating Systems Review, Nov. 1987; 21(5):123-138.

(Continued)

*Primary Examiner* — Patrice Winder
*Assistant Examiner* — Nam Tran
(74) *Attorney, Agent, or Firm* — MH2 Technology Law Group, LLP

(57) ABSTRACT

A method of publishing a publication message includes receiving, at one of a plurality of first relays, a subscription request from a first client and transmitting the subscription request from the one of the plurality of first relays to only one of a plurality of central relays. The method also includes receiving, at another of the plurality of first relays, a publication request from a second client. The publication request includes the publication message. The method further includes transmitting the publication message from the another of the plurality of first relays to all of the plurality of central relays, transmitting the publication message from at least one of the plurality of central relays to the one of the plurality of first relays, and transmitting the publication message from the one of the plurality of first relays to the first client.

17 Claims, 18 Drawing Sheets

(56) References Cited

U.S. PATENT DOCUMENTS

| | | | |
|---|---|---|---|
| 7,725,602 B2 | 5/2010 | Liu et al. |
| 7,734,815 B2 | 6/2010 | Leighton et al. |
| 7,761,570 B1 | 7/2010 | Halley |
| 7,769,826 B2 | 8/2010 | Gustafsson |
| 7,814,202 B2 | 10/2010 | Drees et al. |
| 7,925,747 B2 | 4/2011 | Kirwan et al. |
| 7,925,782 B2 | 4/2011 | Sivasubramanian et al. |
| 7,930,393 B1 | 4/2011 | Baumback et al. |
| 7,933,951 B2 | 4/2011 | Sullivan et al. |
| 2002/0059379 A1 | 5/2002 | Harvey et al. |
| 2002/0129354 A1 | 9/2002 | Bryan et al. |
| 2003/0084057 A1 | 5/2003 | Balogh |
| 2003/0084074 A1 | 5/2003 | Balogh et al. |
| 2003/0084075 A1 | 5/2003 | Balogh et al. |
| 2003/0208539 A1 | 11/2003 | Gildenblat et al. |
| 2004/0039798 A1 | 2/2004 | Hotz et al. |
| 2004/0076155 A1 | 4/2004 | Yajnik et al. |
| 2004/0181588 A1 | 9/2004 | Wang et al. |
| 2004/0194102 A1 | 9/2004 | Neerdaels |
| 2004/0254926 A1 | 12/2004 | Balogh |
| 2005/0027882 A1 | 2/2005 | Sullivan et al. |
| 2005/0105513 A1 | 5/2005 | Sullivan et al. |
| 2005/0108257 A1 | 5/2005 | Ishii et al. |
| 2006/0031432 A1 | 2/2006 | Patrick et al. |
| 2006/0059253 A1 | 3/2006 | Goodman et al. |
| 2006/0085507 A1 | 4/2006 | Zhao et al. |
| 2006/0167968 A1 | 7/2006 | Reynolds et al. |
| 2006/0235885 A1 | 10/2006 | Steele et al. |
| 2007/0061282 A1 | 3/2007 | Ganguly et al. |
| 2007/0070820 A1 | 3/2007 | Gallant |
| 2007/0088711 A1 | 4/2007 | Craggs |
| 2007/0100808 A1 | 5/2007 | Balogh |
| 2007/0150596 A1 | 6/2007 | Miller et al. |
| 2007/0294419 A1 | 12/2007 | Ulevitch |
| 2008/0059152 A1 | 3/2008 | Fridman et al. |
| 2008/0071909 A1 | 3/2008 | Young et al. |
| 2008/0133646 A1 | 6/2008 | Azulai |
| 2008/0133729 A1 | 6/2008 | Fridman et al. |
| 2008/0155254 A1 | 6/2008 | Stradling |
| 2008/0201413 A1 | 8/2008 | Sullivan et al. |
| 2008/0256166 A1 | 10/2008 | Branson et al. |
| 2008/0256553 A1* | 10/2008 | Cullen ............... 719/313 |
| 2008/0260119 A1* | 10/2008 | Marathe et al. ......... 379/93.01 |
| 2008/0307436 A1 | 12/2008 | Hamilton |
| 2009/0024527 A1 | 1/2009 | Sellen et al. |
| 2009/0044246 A1 | 2/2009 | Sheehan et al. |
| 2009/0063664 A1 | 3/2009 | Tiberio, Jr. |
| 2009/0106211 A1 | 4/2009 | Balogh |
| 2009/0106390 A1 | 4/2009 | Kirwan, Jr. et al. |
| 2009/0138572 A1 | 5/2009 | Banks et al. |
| 2009/0157889 A1 | 6/2009 | Treuhaft |
| 2009/0235359 A1 | 9/2009 | Abdulhayoglu et al. |
| 2009/0282027 A1 | 11/2009 | Subotin et al. |
| 2009/0282028 A1 | 11/2009 | Subotin et al. |
| 2009/0282038 A1 | 11/2009 | Subotin et al. |
| 2010/0030897 A1 | 2/2010 | Stradling |
| 2010/0077462 A1 | 3/2010 | Joffe et al. |
| 2010/0082748 A1 | 4/2010 | Banks et al. |
| 2010/0138559 A1 | 6/2010 | Sullivan et al. |
| 2010/0218040 A1 | 8/2010 | Bodmer et al. |
| 2010/0257266 A1 | 10/2010 | Holmes et al. |
| 2010/0274836 A1 | 10/2010 | Orentas et al. |
| 2010/0274970 A1 | 10/2010 | Treuhaft et al. |
| 2010/0287532 A1 | 11/2010 | Smith et al. |
| 2010/0291950 A1 | 11/2010 | Lin et al. |
| 2010/0318858 A1 | 12/2010 | Essawi et al. |
| 2010/0333111 A1 | 12/2010 | Kothamasu et al. |
| 2011/0022678 A1 | 1/2011 | Smith et al. |
| 2011/0029662 A1 | 2/2011 | Drees et al. |
| 2011/0035469 A1 | 2/2011 | Smith et al. |
| 2011/0035497 A1 | 2/2011 | Daly et al. |
| 2011/0047292 A1 | 2/2011 | Gould et al. |
| 2011/0051728 A1 | 3/2011 | Bhogavilli et al. |
| 2011/0099232 A1 | 4/2011 | Gupta et al. |
| 2011/0106891 A1 | 5/2011 | Gallant et al. |
| 2011/0110267 A1 | 5/2011 | Gallant |
| 2011/0161289 A1 | 6/2011 | Pei et al. |
| 2013/0024527 A1 | 1/2013 | Miller et al. |
| 2013/0024528 A1 | 1/2013 | Gallant et al. |
| 2013/0024529 A1 | 1/2013 | Gallant et al. |

OTHER PUBLICATIONS

"Publish/Subscribe" Wikipedia Entry, retrieved from the Internet: <http://en.wikipedia.org/wiki/Publish/subscribe>, 4 pages total.
Final Office Action issued Apr. 30, 2014, U.S. Appl. No. 13/534,732, filed Jun. 27, 2012, pp. 1-37.
Notice of Allowance and Fees Due dated Nov. 7, 2014, U.S. Appl. No. 12/615,205, filed Nov. 9, 2009, pp. 1-52.
Extended European Search Report dated Jan. 23, 2014 from European Application No. 13173188,7, 11 pages.
Supplementary European Search Report dated May 6, 2013 from European Application No. 10828717.8, 7 pages.
Non-Final Office Action dated Jan. 15, 2014, for U.S. Appl. No. 13/534,732, filed Jun. 27, 2012, pp. 1-50.
Non-Final Office Action dated Apr. 24, 2014, issued in U.S. Appl. No. 13/534,786, filed Jun. 27, 2012, pp. 1-46.
International Search Report and Written Opinion of International Application No. PCT/US2010/049872 dated Nov. 23, 2010, 9 Pages.
International Search Report and Written Opinion of International Application No. PCT/US2010/054833 dated Dec. 23, 2010, 9 Pages.
Non-Final Office Action dated Aug. 27, 2014, U.S. Appl. No. 13/534,634, filed Jun. 27, 2012, pp. 1-41.
Non-Final Office Action dated Aug. 27, 2014, U.S. Appl. No. 13/534,732, filed Jun. 27, 2012, pp. 1-38.
Extended European Search Report dated Oct. 14, 2013, European Application No. 13173260.4, filed Jun. 21, 2013, pp. 1-4.
European Search Report dated Oct. 17, 2013 from European Patent Application No. 13173251.3 filed Jun. 21, 2013, pp. 1-6.
Non-Final Office Action dated Jan. 3, 2014, for U.S. Appl. No. 13/534,634, filed Jun. 27, 2012, pp. 1-46.
Final Office Action dated Jan. 27, 2015, U.S. Appl. No. 13/534,634, filed Jun. 27, 2012, pp. 1-21.
Final Office Action dated Jan. 30, 2015, U.S. Appl. No. 13/534,732, filed Jun. 27, 2012, pp. 1-9.

* cited by examiner

HIERARCHICAL PUBLISH AND SUBSCRIBE SYSTEM

BACKGROUND OF THE INVENTION

Publish and subscribe (publish/subscribe) systems are asynchronous messaging systems. Messages are categorized in classes and a subscriber expresses interest in one or more classes of messages to a server. The publisher of a message (publisher) does not send the message to a specific receiver (subscriber), but publishes the message to the server, without knowledge of what (if any) subscribers will receive the message. When a message is received for publication, the server transmits the message to subscribers who have expressed interest in the class associated with the message. Thus, the publishers and subscribers are decoupled in a publish and subscribe system, operating independently of each other.

The first publish and subscribe system was the "news" subsystem in the Isis Toolkit, which was described in a paper "Exploiting Virtual Synchrony in Distributed Systems" at the 1987 ACM Symposium on Operating Systems Principles conference (p. 123-138).

As each user subscribes to various classes of messages, subscribers typically receive only a sub-set of the total messages published. As an example, a subscriber may subscribe to messages based on the topic of the message. Subscribers in a topic-based system will receive all messages published to the topics to which they subscribe. All subscribers to a topic receive the same messages. As another example, a subscriber may subscribe to messages based on the content of the message. In a content-based system, a message is only delivered to a subscriber if the attributes or contents of the message matches constraints defined by the subscriber. Some publish and subscribe system combine topics and contents in a hybrid manner.

In a typical publish and subscribe system, a server receives subscription requests from clients wishing to receive messages based on topic or content. When a user wants to publish a message, the message is sent to the server, which then forwards the message to the various users who have submitted subscription requests matching the message properties. In this way, the server performs a filtering function, only transmitting the message to interested subscribers. Some servers may perform a store-and-forward function during the process of routing messages from publishers to subscribers, decoupling the publishers and subscribers temporally. An example of this temporal decoupling is temporarily taking down a publisher in order to allow the subscriber to work through the backlog, producing a form of bandwidth throttling.

For relatively small installations, publish and subscribe systems, through parallel operation, message caching, and the like, can provide better scalability than a traditional client-server system. However, as a publish and subscribe system is scaled up, benefits provided by the publish and subscribe system are often lost. Thus, despite the functionality provided by conventional publish and subscribe systems, there is a need in the art for improved publish and subscribe systems as well as methods for using such systems.

SUMMARY OF THE INVENTION

The present invention relates generally to computer networks. More specifically, the present invention relates to methods for operation of a publish and subscribe system. Merely by way of example, the invention has been applied to a publish and subscribe system in which a remote relay receives a subscription request from a client and subscribes to a single central relay. Publication requests from clients result in messages being transmitted to all remote relays that have subscribed for a particular publication. Thus, a system of "subscribe to one/publish to all" is implemented by embodiments of the present invention. The methods and techniques can be applied to a variety of computer networks and communications systems.

According to an embodiment of the present invention, a method of publishing a publication message is provided. The method includes receiving, at one of a plurality of first relays, a subscription request from a first client and transmitting the subscription request from the one of the plurality of first relays to only one of a plurality of central relays. The method also includes receiving, at another of the plurality of first relays, a publication request from a second client. The publication request includes the publication message. The method further includes transmitting the publication message from the another of the plurality of first relays to all of the plurality of central relays, transmitting the publication message from at least one of the plurality of central relays to the one of the plurality of first relays, and transmitting the publication message from the one of the plurality of first relays to the first client.

According to another embodiment of the present invention, a method of publishing a publication message to multiple clients is provided. The method includes receiving a first request at a remote relay from a first client an receiving a second request at the remote relay from a second client. The first request and the second request include a target. The method also includes transmitting a subscription message from the remote relay to a central relay. The subscription message includes the target. The method further includes receiving the publication message at the central relay from a third client. The publication message includes a pattern and at least a portion of the pattern matches the target. The method additionally includes transmitting at least a portion of the publication message from the central relay to the remote relay and transmitting at least a portion of the publication message from the remote relay to the first client and the second client.

According to a specific embodiment of the present invention, a method of publishing a publication message is provided. The method includes receiving, at a central relay of a plurality of central relays, a subscription request from a first client. The subscription request includes a target. The method also includes receiving, at another relay, the publication message from a second client. The publication message includes a pattern. The method further includes determining that the target matches at least a portion of the pattern, transmitting at least a portion of the publication message from the another relay to all of the plurality of central relays, and transmitting at least a portion of the publication message from at least the central relay to the first client.

According to another specific embodiment of the present invention, a method for publishing a publication message is provided. The method includes receiving, at a first central relay of a plurality of central relays, a subscription request from a first client. The subscription request includes a target. The method also includes receiving, at a second central relay of the plurality of central relays, a publication request from a second client. The publication request includes the publication message and the publication message includes a pattern. The method further includes determining that the target is correlated to the pattern, transmitting the publication message from the second central relay to the first central relay and to other central relays of the plurality of central relays, and transmitting the publication message from the first central relay to the first client.

According to an alternative embodiment of the present invention, a method of publishing a publication message including a pattern is provided. The method includes receiving, at a single central relay of a plurality of central relays, a subscription request from a first client. The subscription request includes a condition associated with a target. The method also includes receiving, at a second relay, a publication request from a second client. The publication request includes the publication message. The method further includes transmitting the publication message from the second relay to all of the plurality of central relays if the second relay is not a central relay or transmitting the publication message to all of the plurality of central relays except for the second relay if the second relay is a central relay. The method additionally includes determining that the pattern in the publication message satisfies the condition associated with the target and transmitting the publication message from the single central relay to the first client.

Many benefits are achieved by way of the present invention over conventional techniques. For example, by introducing a hierarchical structure for the publish and subscribe system, the number of connections from remote sites to central sites is greatly reduced. A reduction in the number of connections results in decreased system complexity in relation to configuring, maintaining, and running the IP network, enhanced security, and improved system performance. Additionally, embodiments of the present invention enhance system performance by reducing the number of duplicate subscriptions. Moreover, embodiments of the present invention enable clients to post messages to and receive messages from remote relays, even while the server process is not running on a central relay. Additionally, data can be logged during operation, providing an audit trail. These and other embodiments of the invention along with many of its advantages and features are described in more detail in conjunction with the text below and attached figures.

DETAILED DESCRIPTION OF SPECIFIC EMBODIMENTS

Figure 1A:
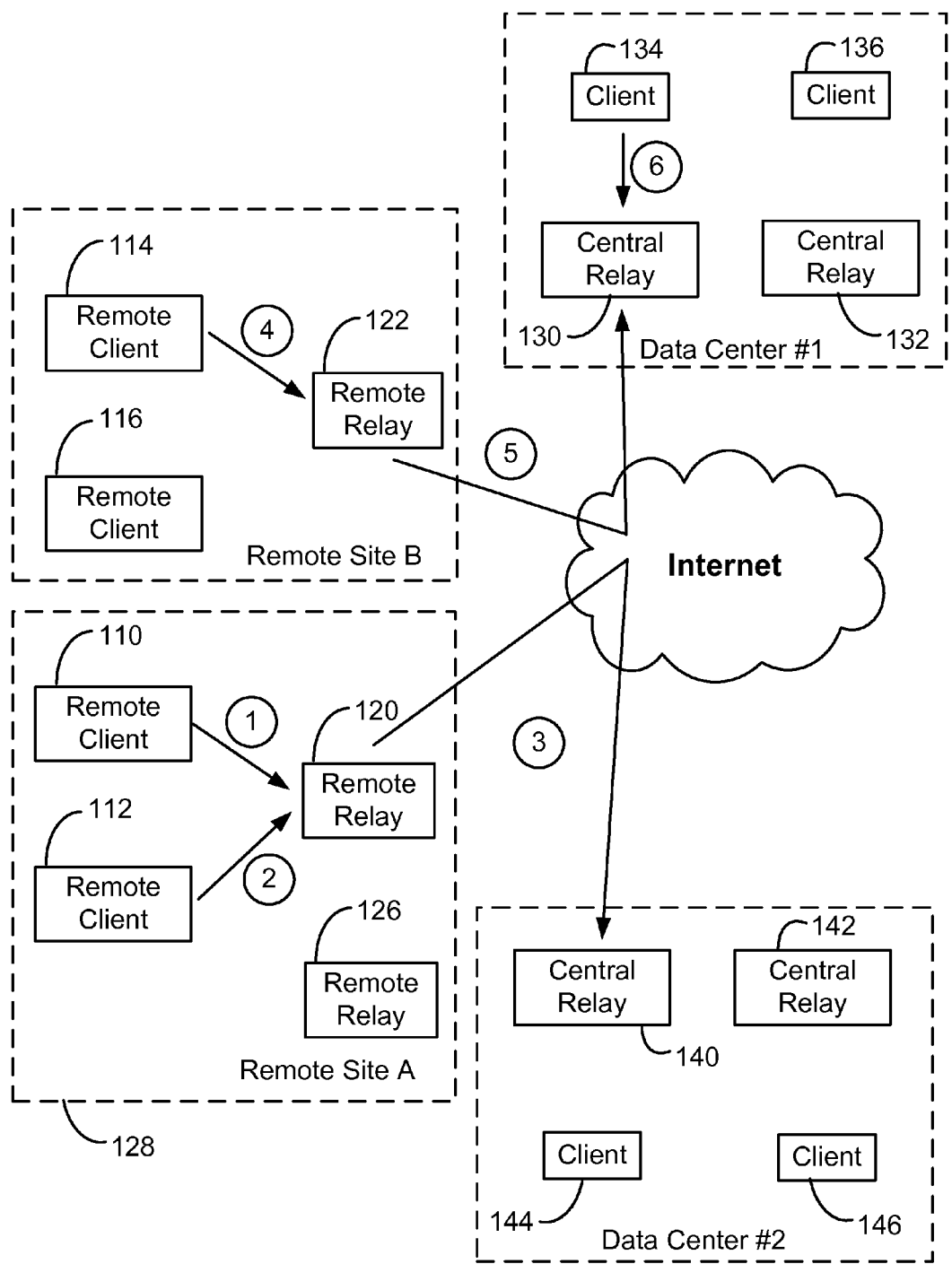
FIG. 1A is a simplified schematic diagram of remote sites and central data centers implementing a subscription request from multiple remote clients according to an embodiment of the present invention.

As discussed above, typical publish and subscribe systems are one-level implementations in which a server interacts with subscribers and publishers. Each subscriber submits subscription requests to the server and each publication request is also submitted to the server. A drawback of using a conventional one-level system is that each client (either publisher or subscriber) is connected to the server, which results in a large number of connections between the clients and the server. The large number of connections, in turns, results in complexity in configuring, maintaining, and running the network on account of firewall rules, configuration of multiple logical paths, and the like.

Embodiments of the present invention utilize a hierarchical structure that reduces the number of connections from clients to central sites, for example, by an order of magnitude. Reducing the number of connections reduces the complexity of the network and associated configuration, maintenance, etc. Additionally, reducing the number of connections between clients and central sites enhances security since fewer connections are established and the reduced number of connections can be more carefully tracked and controlled. Moreover, reducing the number of connections improves performance on both the servers and clients since the load on these systems associated with handling connection processing is reduced.

The Hydra Messaging Service (HMS) system operated by the present assignee is a publish and subscribe implementation used for message passing. The system can also be referred to as a message bus. Utilizing the HMS system, messages can be sent between edge sites and central sites, for example, to transmit and receive monitoring data and commands. Messages can include statistics on the functioning of SDNS, WHOIS, TGV, CRL, or the like. These statistics can be provided to system operators in real time using a heads-up-display or other suitable reporting system. Additionally, the messages can be stored and used for analysis and reporting of historical data related to system functionality and performance.

Embodiments of the present invention utilize a hierarchical architecture for the publish and subscribe system. Although two levels of hierarchy are illustrated and discussed herein (i.e., remote relays and central relays), the present invention is not limited to two levels and the system can be extended to an arbitrary number of levels of hierarchy as appropriate to the particular application. The hierarchical publish and subscribe system described herein provides benefits not available using conventional techniques including redundancy, security, and performance.

As an overview, when a remote client wants to subscribe to a particular message group, a subscription request is transmitted from the remote client to a remote relay, which then passes the subscription request on to exactly one central relay. When the remote client wants to publish a message, it publishes to the remote relay, which then publishes the message (in the form of a publication request) to all central relays. The central relays then publish the message to the remote relays that have subscribed to the particular message group (typically using a lookup table stored by the central relay) and those remote relays, in turn, publish the message to the clients that have subscribed to the particular message group (also typically using a lookup table stored by the remote relay). The central relays can also publish the message to directly connected clients (e.g., central clients co-located with the central relay). The term directly connected includes clients that are not physically connected, but connected via a remote relay. Thus, the client may be geographically distant and the connection may traverse many routers/switches/networks. In references to co-located clients, the client may also be directly connected as described above. Each central relay stores a list of subscription requests that it has received from remote relays and central clients.

Table 1 illustrates processes performed in relation to subscription and publication requests received from clients. For a remote relay, when a subscription request (subscribe) is received, the remote relay enters a subscription for the particular message type and then forwards the subscription request to a central server. The subscription request records the target and the reader. Forwarding of a subscription request includes the remote relay subscribing to a single central relay on behalf of the client that originated the subscription request. For a central relay, when a subscription request is received, the central relay enters a subscription, but does not need to forward the subscription request. In fact, by the remote relay only subscribing to a single central relay and the central relays not forwarding subscription requests, embodiments of the present invention prevent duplicate or redundant subscriptions as well as duplicate or redundant publications.

In relation to publication requests (publish), when a remote relay receives a publication request from a client, the remote relay forwards the publication request to all central relays contained in the list of central relays maintained by the remote relay. When a central relay receives a publication request from a client, it both publishes the publication message to all readers subscribed to the target and forwards the publication request to all the other central relays.

When a remote relay receives a publication request from a server, it will publish the publication request (or a portion of the publication request such as the publication message) to all readers subscribed to the target. Similarly, when a central relay receives a publication request from a server, it will publish the publication request (or a portion of the publication request such as the publication message) to all readers subscribed to the target.

TABLE 1

|  | Remote Relay | Central Relay |
| --- | --- | --- |
| Receive a Subscription Request | Subscribe + Forward-Subscribe | Subscribe |
| Receive a Publication Request from a Client | Forward-Publish | Forward-Publish + Publish |
| Receive a Publication Request from a Server | Publish | Publish |

FIG. 1A is a simplified schematic diagram of remote sites and central data centers implementing a subscription request from multiple remote clients according to an embodiment of the present invention. Client subscribers will send subscription messages indicating that these subscribers want to get all messages having certain characteristics. In conventional one-level systems, the client would send the subscription request to the server. Embodiments of the present invention provide multiple levels of hierarchy in which a client may send the subscription request to either a central relay or a remote relay. Referring to FIG. 1A, remote client 110 sends a subscription request (1) to remote relay 120. Additionally, remote client 112 sends a subscription request (2) to remote relay 120. The subscription requests can be for the same type of message, that is, the subscription messages include a target that is shared by several subscription messages, or they could be for different messages. As an example, remote client 110 may be interested in messages "starting with x" and remote client 112 may be interested in messages "starting with y."

As an example, a DNS service running on a server may track the number of DNS translations in a given time period. This DNS translation rate can be published as a statistic that other clients may be interested in receiving. This DNS translation statistic could begin with a predetermined character or string, for example, "DNST." Subscription requests for this DNS translation statistic will therefore, include a condition that a string in the publication message will satisfy. For this example, the condition would be strings that start with "DNST." This condition can also be referred to as a target and the string in the publication message can be referred to as a pattern. For this example, the pattern could be DNST100, indicating 100 DNS translations in a second. When a relay receives this pattern or string in a list of statistics being distributed to the system, the target DNST will be compared against the pattern DNST100, and patterns that start with the target DNST will satisfy the defined condition. Accordingly, the relay will deliver this statistic to the clients that have subscribed to these DNS translation statistics.

Another example it may be desirable to send a command to a particular machine. In order to send this command, the machine could subscribe, providing it's machine name to the remote relay. Another machine can then send a publication message including the machine name of interest. During the publication process, the desired machine will receive the message based on the machine name of interest. Another variation on this command mode is that a publication message could be sent to all machines using a wildcard. One of ordinary skill in the art would recognize many variations, modifications, and alternatives.

Thus, the subscription message has a condition, also referred to as a target, and the published message is examined by the central relays and the remote relays to determine if the strings included in the published message have a pattern that satisfies the condition defined by the subscription message. As an example, the target could be a string of a first length (e.g., 4 characters) and the pattern could be a string of a second length (e.g., 10 characters) greater than the first length. The published messages are examined to determine if the targets of interest match portions of the patterns in the message. If the target matches a portion or all of the pattern, then the relay will direct the published message or some portion or variant thereof, to the other relays and clients that have subscribed using the target. The published message may be changed to another message as long as the clients that have subscribed using the target receive information indicating related to their subscription.

Remote relay 120 will maintain a database or other list of the subscription requests in order to provide messages having strings that match the conditions associated with the targets to the various clients that have subscribed to receive these messages.

Although it is not required by the present invention, remote clients 110 and 112 and the remote relay 120 are co-located at Remote Site A, with dashed line 128 representing a geographical boundary, that is, the geographical area associated with Remote Site A. It is also possible to have multiple levels of hierarchy without having multiple geographies. In the embodiment illustrated in FIG. 1A, two remote sites and two data centers, all at different geographical locations are illustrated, although this is merely an example and the present invention is not limited to this particular example. The present assignee maintains remote sites (also referred to as edge sites) located in many countries throughout the world. Additionally, the present assignee maintains data centers connected to these remote sites.

After remote relay 120 receives the subscription requests from remote clients 110 and 112, a single subscription request is transmitted (3) to a single central relay 140. In this example, the subscription requests specify the same message type, that is, they have the same target, but it will be appreciated that the subscription requests can be for different types of messages. Since, in this simplified example, the subscription requests from remote relays 110 and 112 are for the same message type, then remote relay 120 aggregates the multiple requests into a single subscription request, saving network bandwidth. Utilizing the database of subscription requests, both remote clients will receive the desired message when received by remote relay 120 as described more fully below. Depending on the characteristics of the subscription request, the subscription requests may not be aggregated. One of ordinary skill in the art would recognize many variations, modifications, and alternatives. The subscription request from remote relay 120 is only sent to one central relay 140. If multiple subscription requests are subsequently received, they will also be sent to a single central relay, since each remote relay subscribes to one central relay at a time as described more fully throughout the present specification.

The hierarchical structure provided by embodiments of the present invention reduces system complexity in comparison with conventional techniques in which the remote clients as well as clients located in a data center, were attached into the data center directly. Each client would thus have a connection. Along with all these connections, there are attendant firewall rules, security holes, network traffic, and the like. As described above, by connecting through a remote relay, multiple identical subscription requests (received from multiple clients) are aggregated into a single subscription request transmitted from the remote relay to a single central relay. Thus, rather than multiple identical subscription requests from multiple clients, a single subscription request can be used, reducing system complexity.

In order to eliminate redundant identical messages, each remote relay and each central client subscribes to only one central relay. Referring to FIG. 1A, remote relay 120 only transmits its subscription requests to central relay 140, which is located in Data Center #2. Client 144 may be included in Data Center #2. Each of the central relays will maintain a database or other list including information related to the subscription requests received by the particular central relay. By subscribing to a single central relay, when messages are published, each central relay will only publish the messages to remote relays and central clients that have subscribed to the particular message type. Because each remote relay only subscribes to one central relay, duplication of messages will not result, thereby providing each remote relay with only one copy of the messages of interest. In turn, the remote relays will pass on the messages of interest to the various remote clients that have subscribed to the particular remote relay. The particular central relay to which remote relays subscribe will be determined by system configuration and does not limit embodiments of the present invention.

As illustrated in FIG. 1A, connections are provided between the central relays and the remote relays. At the logical level, there is a network (e.g., the Internet) underlying the relays so that information from each of the relays, either remote or central, can be communicated to all of the other relays. Although some connections may be impacted by firewall rules and the like, conceptually, a network cloud provides connections between the various relays. In one implementation, the network cloud exists at the TCP/IP level. In another implementation, the network cloud exists as the UDP level. The present invention is not constrained by either of these particular implementations and other protocols can be utilized. In one implementation, connections at the bottom level of the TCP/IP stack are initiated from the central relays out to the remote relays for security reasons. The actual application level connection may be different than the lower level connection. In this implementation, a subscribe request is transmitted from the edge to the center (i.e., remote relay to central relay) but the lower level connection used to connect two TCP/IP endpoints is transmitted from the center to the edge.

Referring once again to FIG. 1A, remote client 114 transmits a subscription request (4) to remote relay 122, which in turn, transmits a subscription request (5) to a single central relay 130 located in Data Center #1. Additionally, central client 134 subscribes to certain message types by communicating a subscription request (6) to a single central relay 130. For purposes of clarity, only one subscription request is illustrated for each remote or central client and the present invention is not limited to a single such request. Multiple requests for different message types can be generated by the clients. One of ordinary skill in the art would recognize many variations, modifications, and alternatives.

Although remote client 110 and remote client 112 are connected to remote relay 120, the configuration data for these remote clients can include information related to remote relay 126, which can serve as a backup to remote relay 120. Redundancy is provided since if remote relay 120 goes down, clients 110 and 112 can initiate a connection to remote relay 126 in order to continue receiving service. The new connections to remote relay 126 can be created automatically or otherwise.

Figure 1B:
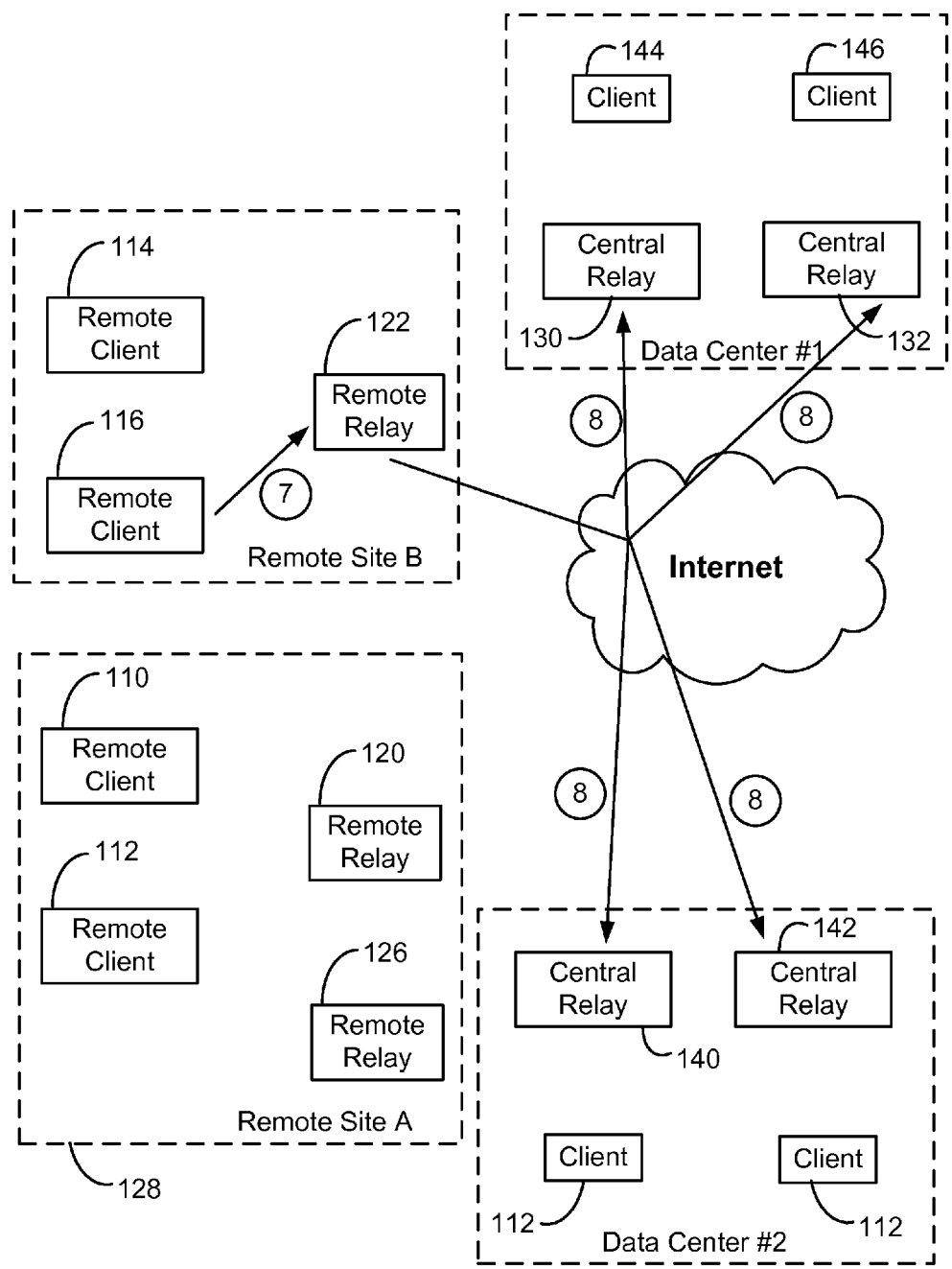
FIG. 1B is a simplified schematic diagram of remote sites and central data centers implementing a first stage of publication of a message from a remote client according to an embodiment of the present invention.

FIG. 1B is a simplified schematic diagram of remote sites and central data centers implementing a first stage of publication of a message from a remote client according to an embodiment of the present invention. Remote client 116 transmits a publication request (7) to remote relay 122. Both remote client 116 and remote relay 122 are co-located at remote site B. After receiving the publication request, which includes a message having a pattern, remote relay 122 transmits the publication request or a modified version of the publication request to all of the central relays: central relays 130 and 132 located in Data Center #1 and central relays 140 and 142 located in Data Center #2.

Embodiments of the present invention provide redundancy because the remote relays subscribe to only one central relay at a time, but publish their messages to all of the central relays. As illustrated in FIG. 1B, when remote client 116 transmits a publication request including a message, the message is sent from remote relay 122 to all central relays 130, 132, 140, and 142. In some embodiments, the configuration of the remote relay includes information on all the central relays, enabling this "publish to all" behavior. In other embodiments, the central relays identify themselves during handshaking performed in the connection establishment phase. As described more fully throughout the present specification, the central relays do not publish subscription messages to each other, since, if a subscription request is received at a central relay, this is sufficient to publish messages of interest to the central clients and remote relays serviced by the central relay.

The implementation of "subscribe to one, publish to all" enables clients to reliably receive only one copy of each message meeting the client's subscription criteria. A client will not want to receive more than one copy of each message since this will result in duplicate messages. If, for example, the message contains a measurement, then the client would effectively end up double counting the measurement. Additionally, even though the remote relays transmit messages to multiple recipients in the form of central relays, there is confidence that the clients will only receive a single message, not duplicates based on their subscription to only one relay.

In the example shown in FIG. 1B, a single remote client publishes a message, but it will be understood that multiple remote clients can publish messages using the methods described herein.

Figure 1C:
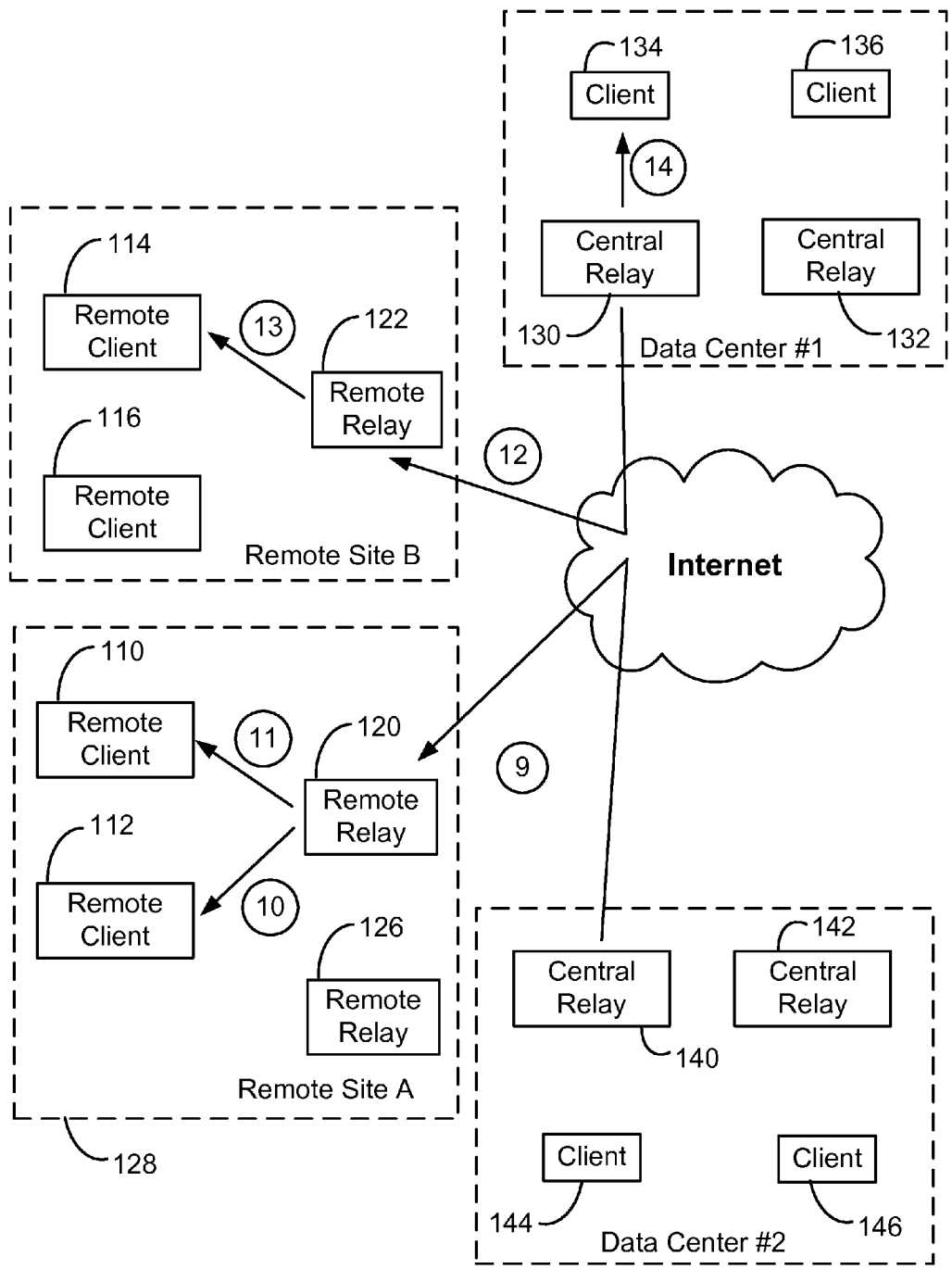
FIG. 1C is a simplified schematic diagram of remote sites and central data centers implementing a second stage of publication of a message from a remote client according to an embodiment of the present invention.

FIG. 1C is a simplified schematic diagram of remote sites and central data centers implementing a second stage of the publication of a message from a remote client according to an embodiment of the present invention. The central relays maintain a database including the types of messages that have been requested by the remote relays and centrally located clients. Since central relay 140 received subscription requests matching the message published by remote client 116, central relay 140 transmits the message to remote relay 120 (9). When the remote relay receives a message, it is able to forward the message on to clients interested in the particular message. The remote relays maintain a database of subscription requests that they have received from clients. Thus, the central relay does not necessarily know the identity of the various clients that will receive messages from the remote relays. Thus, remote relay 120 in turn, transmits the message to remote client 110 (10) and remote client 112 (11). Additionally, central relay 130 transmits the message to remote relay 122 (12), which transmits the message to remote client 114 (13). Central relay 130 also transmits the message to central client 134 (14). Thus, the three clients that subscribed to this message type receive the message when it is published.

Although only two data centers are illustrated, this is merely an example and additional data centers can be utilized. Similarly, the number of remote sites per data center may be more than one. Additionally, although only two levels of hierarchy are illustrated, additional levels could be utilized, with the most remote level connected to less remote levels, which are connected to the data centers. In other embodiments, there is a multiple remote relay hierarchy of the remote relays, each subordinate to a higher level remote relay in the system. Each of the remote relays will maintain a subscription list. In these systems with a multiple remote relay hierarchy, the term remote is relative since there will be a remote relay at the bottom of the system, with intermediate relays operating at higher levels of the hierarchy, and central relays at the top of the hierarchy. An architecture can be considered in terms of a remote relay at the city level, an intermediate relay at the county level, another intermediate relay at the state level, and the like, with the central relays at the highest level.

FIGS. 1A-1C illustrate clients that are able to both subscribe and publish. These clients can be remotely located (e.g., remote client 110) or co-located with the central relays in the data centers (e.g., central client 134). Typically, data (e.g., performance reporting, raw data packets that are sampled, authorization requests, and the like) constitutes the majority of traffic flowing from the remote sites to the data centers, while commands constitute the majority of the flow from the data centers to the remote sites. In other applications, the data and command flow may be varied. One of ordinary skill in the art would recognize many variations, modifications, and alternatives.

According to some embodiments of the present invention, if a subscription request and a publication request are routed to the same remote relay, the central relay that the remote relay is connected to can maintain a list of these subscription and publish requests so that the central relay does not have to receive the publication message from the remote relay and then send the same publication message back to the remote relay. Thus, in some embodiments, the handling of both requests can be performed at the remote relay to conserve system resources.

Figure 2A:
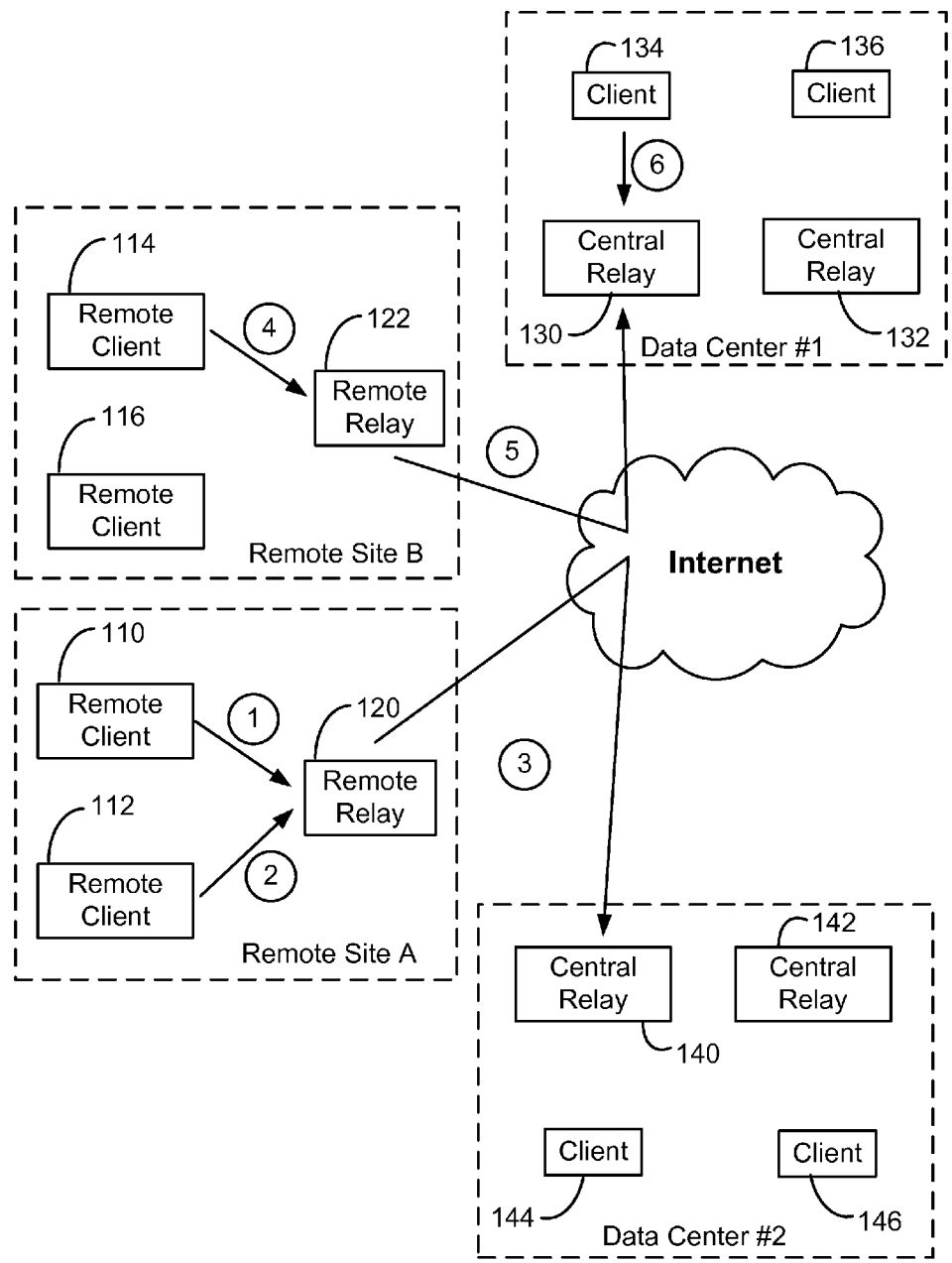
FIG. 2A is a simplified schematic diagram of remote sites and central data centers implementing a subscription request from multiple remote clients.

FIG. 2A is a simplified schematic diagram of remote sites and central data centers implementing a subscription request from multiple remote clients. In the embodiment illustrated in FIGS. 2A and 2B, remote clients submit subscription requests and a central client submits the publication request. Remote clients 110 and 112 submit subscription requests to remote relay 120 (1 and 2). These subscription requests are transmitted to a single central relay 140 (3). In addition to remote clients 110 and 112, subscription requests are submitted by remote client 114 (4) and central client 134 (6). Remote relay 122 transmits the subscription request from remote client 114 to central relay 130 (5), which also received the subscription request from central client 134.

Figure 2B:
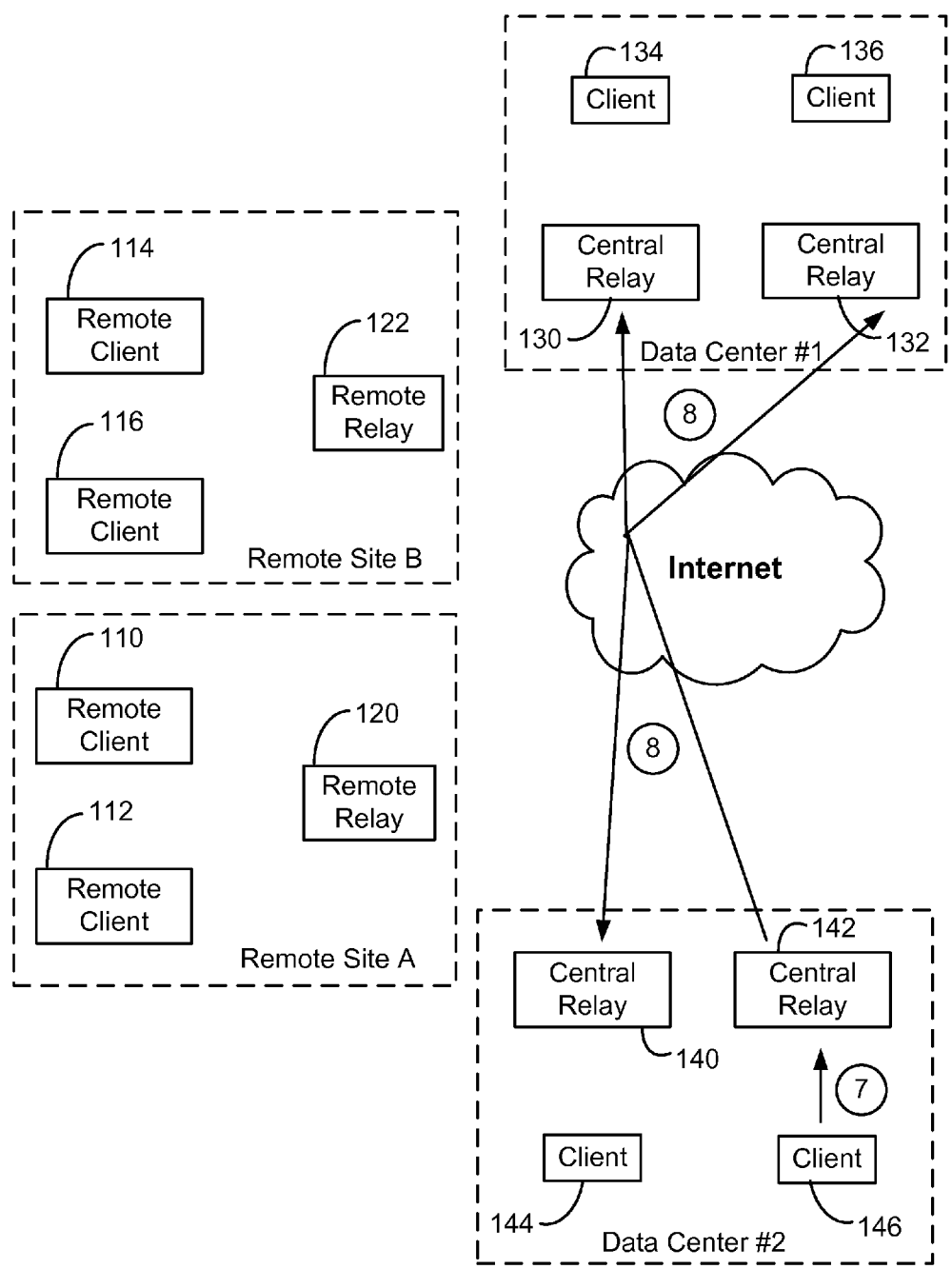
FIG. 2B is a simplified schematic diagram of remote sites and central data centers implementing a first stage of the publication of a message from a central client according to an embodiment of the present invention.

FIG. 2B is a simplified schematic diagram of remote sites and central data centers implementing a first stage of the publication of a message from a central client according to an embodiment of the present invention. The publication request is transmitted from central client 146 to central relay 142 (7). The central relay communicates the publication request to each of the other central relays (i.e., all central relays except for the central relay initially receiving the publication request). Thus, the publication request is transmitted to all the central relays (8) in accordance with the "subscribe to one, publish to all" technique provided by some embodiments of the present invention.

Figure 2C:
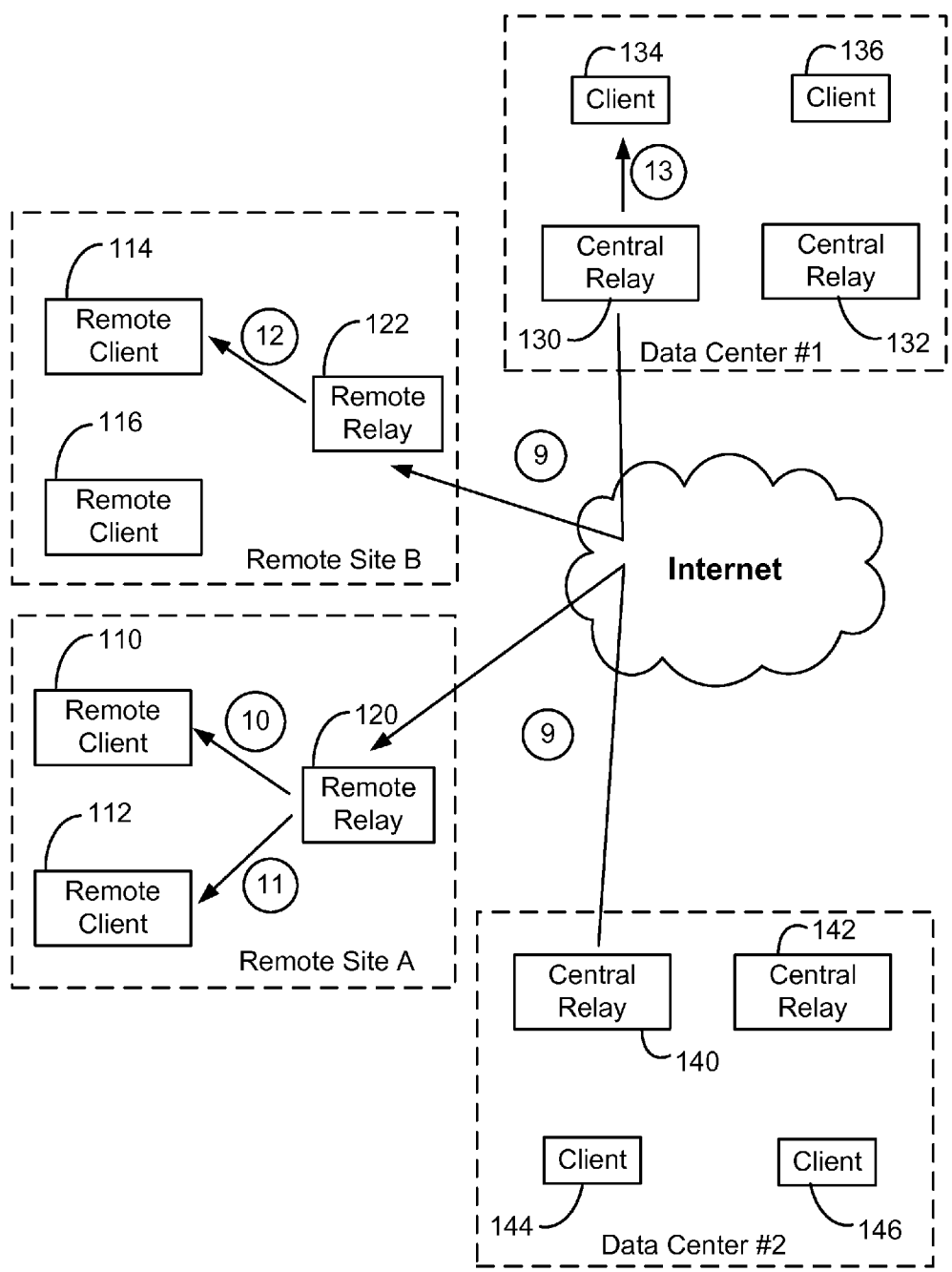
FIG. 2C is a simplified schematic diagram of remote sites and central data centers implementing a second stage of the publication of a message from a central client according to an embodiment of the present invention.

FIG. 2C is a simplified schematic diagram of remote sites and central data centers implementing a second stage of the publication of a message from a central client according to an embodiment of the present invention. Central relays 130 and 140, which had received subscription requests, publish the publication request to subscribing remote relays 102 and 122 (9). The remote relays in turn, publish the publication message to the remote clients that have submitted subscription requests. Thus, remote relay 120 publishes to remote clients 110 and 112 (10) and (11) since they have expressed interest in this message type and remote relay 122 publishes to remote client 114 (12). Central relay 130 also publishes the publication message to central client 134 (13). Thus, all subscribing clients receive the publication message sent from central client 146.

As described above, the hierarchy enables a reduction in the number of subscription requests transmitted to the central relays. In a similar manner, the hierarchy enables a reduction in the number of messages transmitted from the central relays. As an example, when client 146 transmits a message of interest to both remote clients 110 and 112, rather than two messages being sent from central relay 140, only a single message is transmitted from central relay 140 to remote relay 120. The reduction in message traffic from the central relays results in savings on transition costs, maintenance, security rules, CPU cycles, and the like.

It should be noted that an additional benefit provided by the hierarchical systems described herein is that remote relays can transmit an identical message to multiple central relays located at different data centers. Thus, the remote relay can duplicate messages and then send the duplicate messages to different data centers so that if one data center goes down, then the message is still received at the other data center, providing an additional level of system redundancy.

Embodiments of the present invention provide a high level of flexibility for clients. A client can enroll in new subscriptions and provide new services easily. The decentralized system enables a client to indicate an interest in a particular class of messages without having to register at a central server.

Figure 3A:
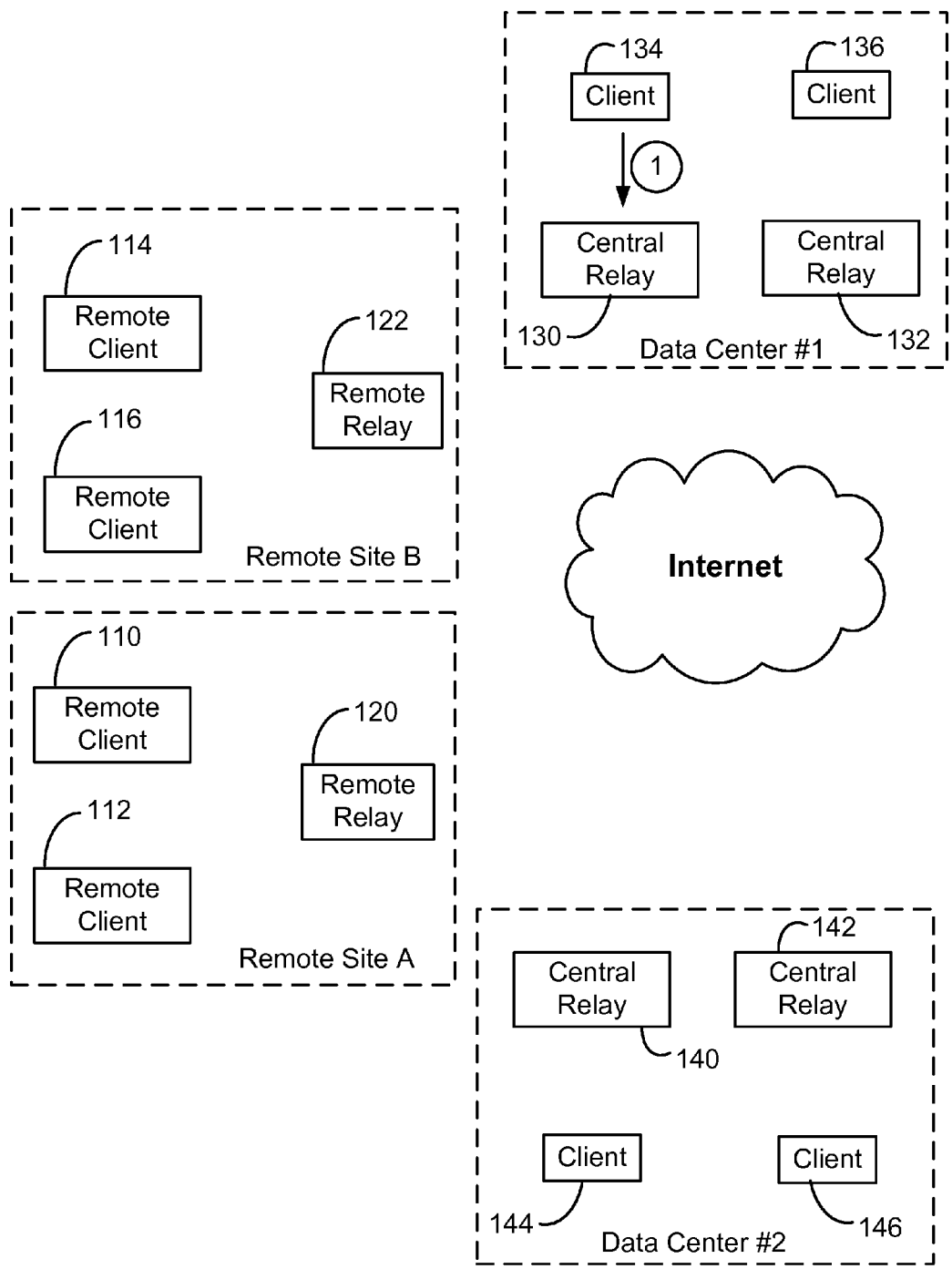
FIG. 3A is a simplified schematic diagram of remote sites and central data centers implementing a subscription request from a central client.

FIG. 3A is a simplified schematic diagram of remote sites and central data centers implementing a subscription request from a central client. In this embodiment, central client 134 submits a subscription request to central relay 130 indicating a type of message in which central client 134 is interested (1). The subscription request includes a target, which can also be referred to as an indicator of a message type. According to embodiments of the present invention, once the subscription request is received at central relay 130, no additional action related to the subscription request is initially taken since the other central relays do not need to be informed of the subscription request.

Figure 3B:
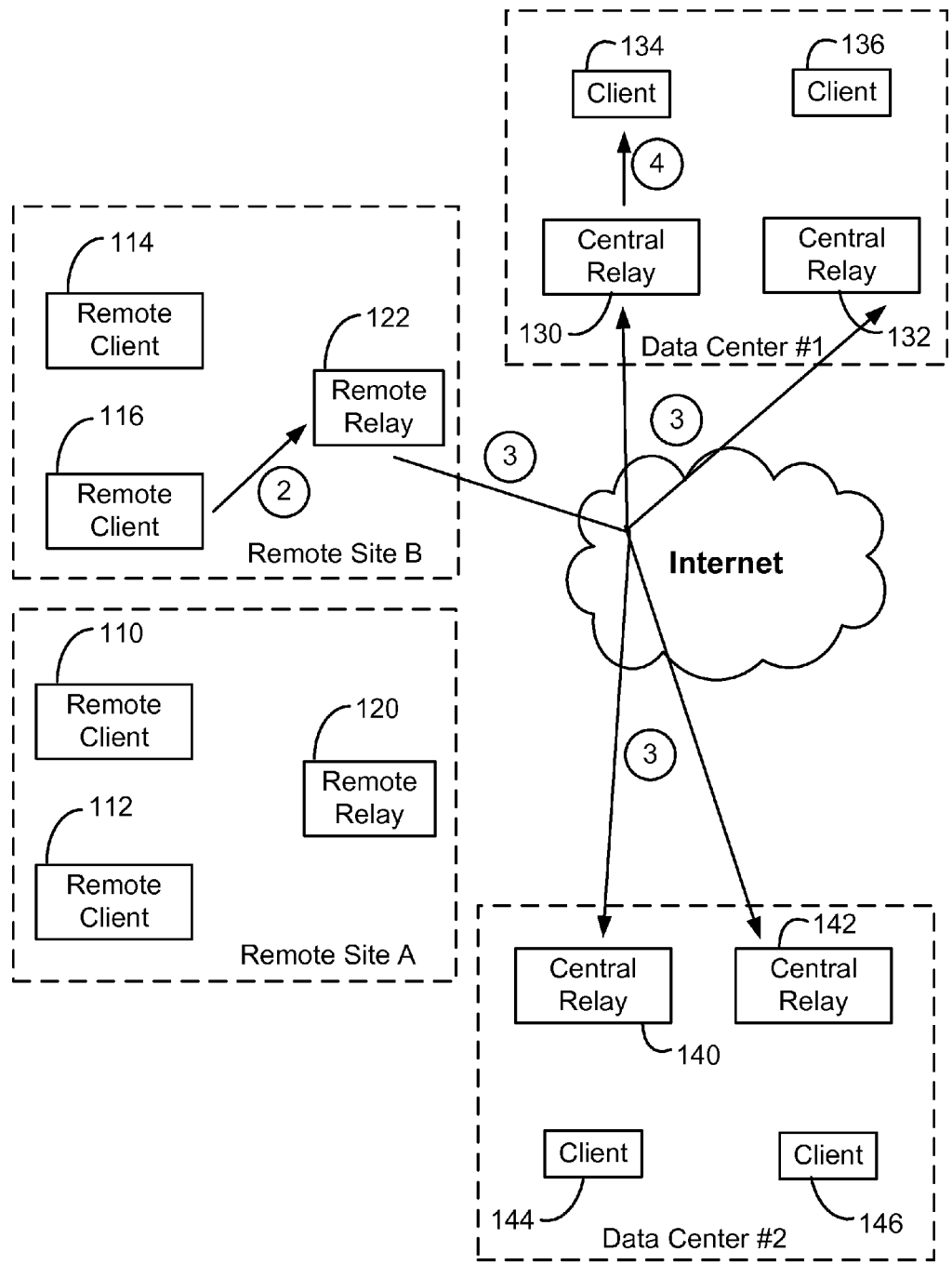
FIG. 3B is a simplified schematic diagram of remote sites and central data centers implementing publication of a message from a remote client.

FIG. 3B is a simplified schematic diagram of remote sites and central data centers implementing publication of a message from a remote client. Remote client 116 transmits a publication request (2) including a message that has a pattern, a portion of which matches the target indicated by central client 134 in its subscription request. The publication request, the message, or a variation of the publication request is transmitted by remote relay 122 to all the central relays (3). In turn, central relay 130, which maintains a database including the interest of central client 134 in messages of this particular type, transmits the message to central client 134 (4). Because, in this example, the other central relays have not received subscription requests, they take no action and the publication request is received without any resulting action by these central relays. In other words, since only central relay 130 has received a subscription request, it is the only relay that needs to publish the publication message.

Figure 4A:
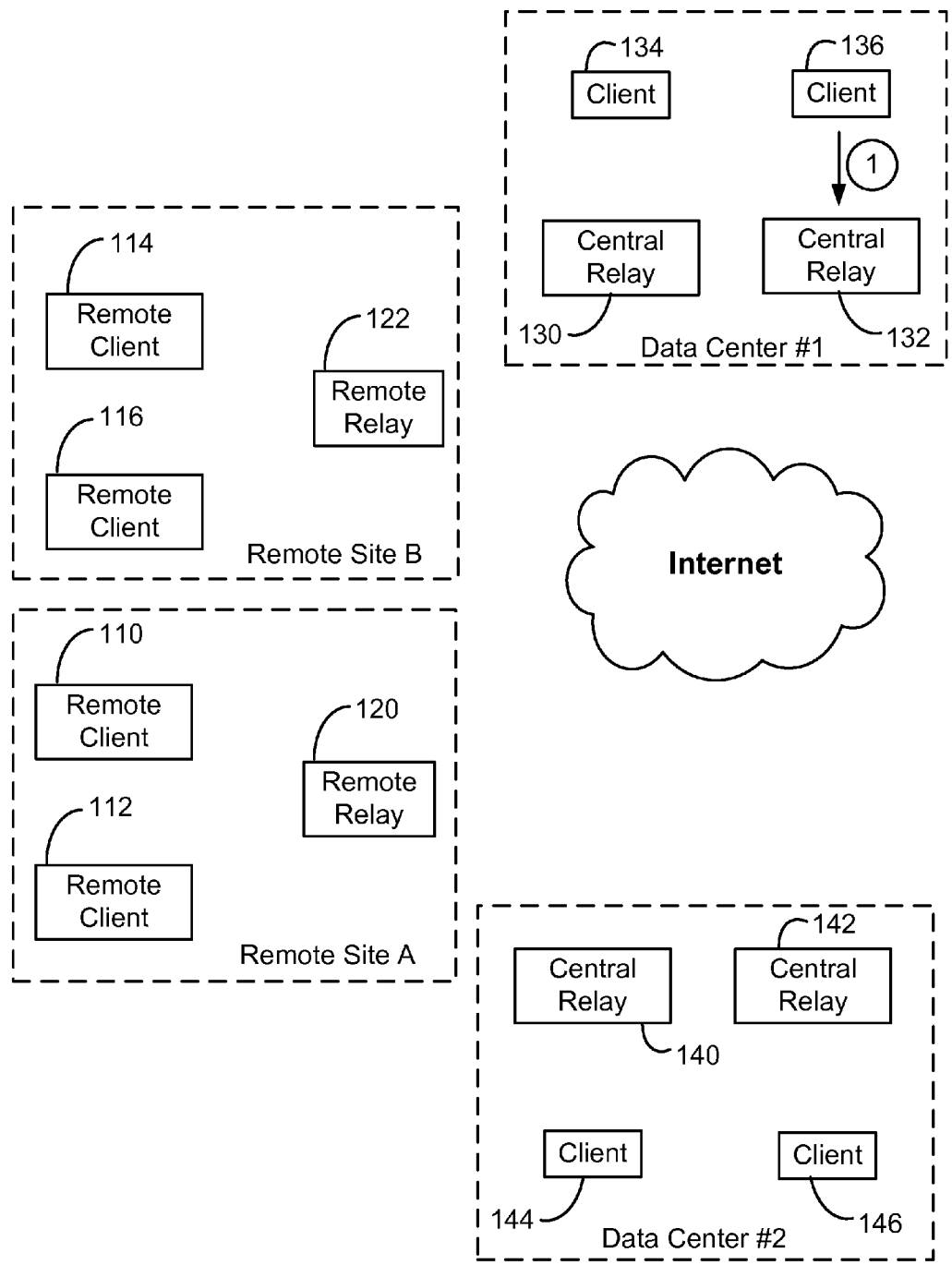
FIG. 4A is a simplified schematic diagram of remote sites and central data centers implementing a subscription request from a central client.
Figure 4B:
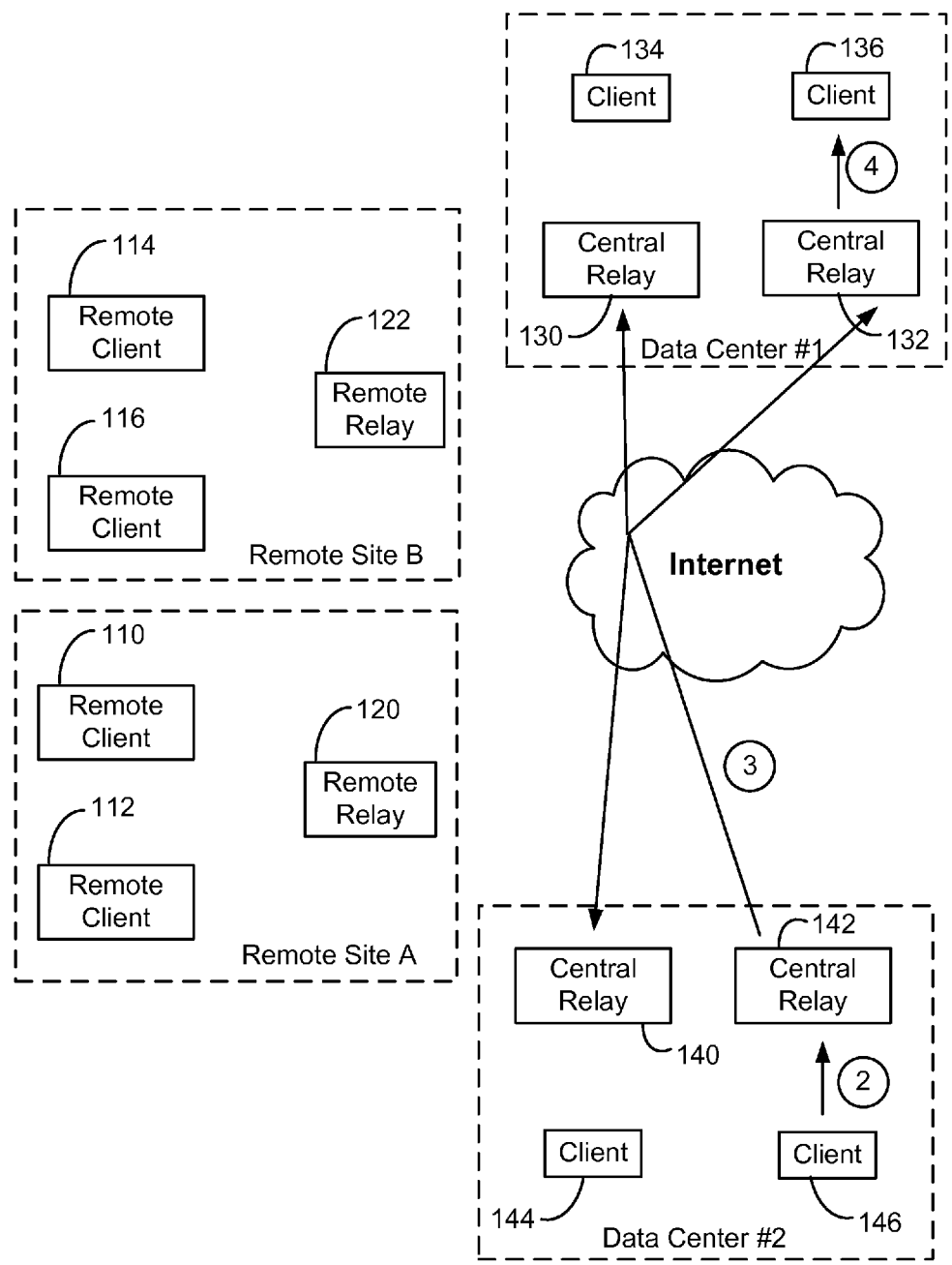
FIG. 4B is a simplified schematic diagram of remote sites and central data centers implementing publication of a message from a central client.

FIG. 4A is a simplified schematic diagram of remote sites and central data centers implementing a subscription request from a central client. Similar to the subscription request illustrated in FIG. 3A, a central client 136 submits a subscription request to a single central relay 132 (1). FIG. 4B is a simplified schematic diagram of remote sites and central data centers implementing publication of a message from a central client. Central client 146 transmits a publication request to central relay 142 (2), which then transmits the publication request to all the other central relays (3). Central relay 132 then transmits the message to client 136 (4), which had expressed interest in this particular message type. As discussed in relation to FIG. 3B, since only central relay 132 has received a publication request, it is on the only central relay to publish the message from client 146.

Figure 10A:
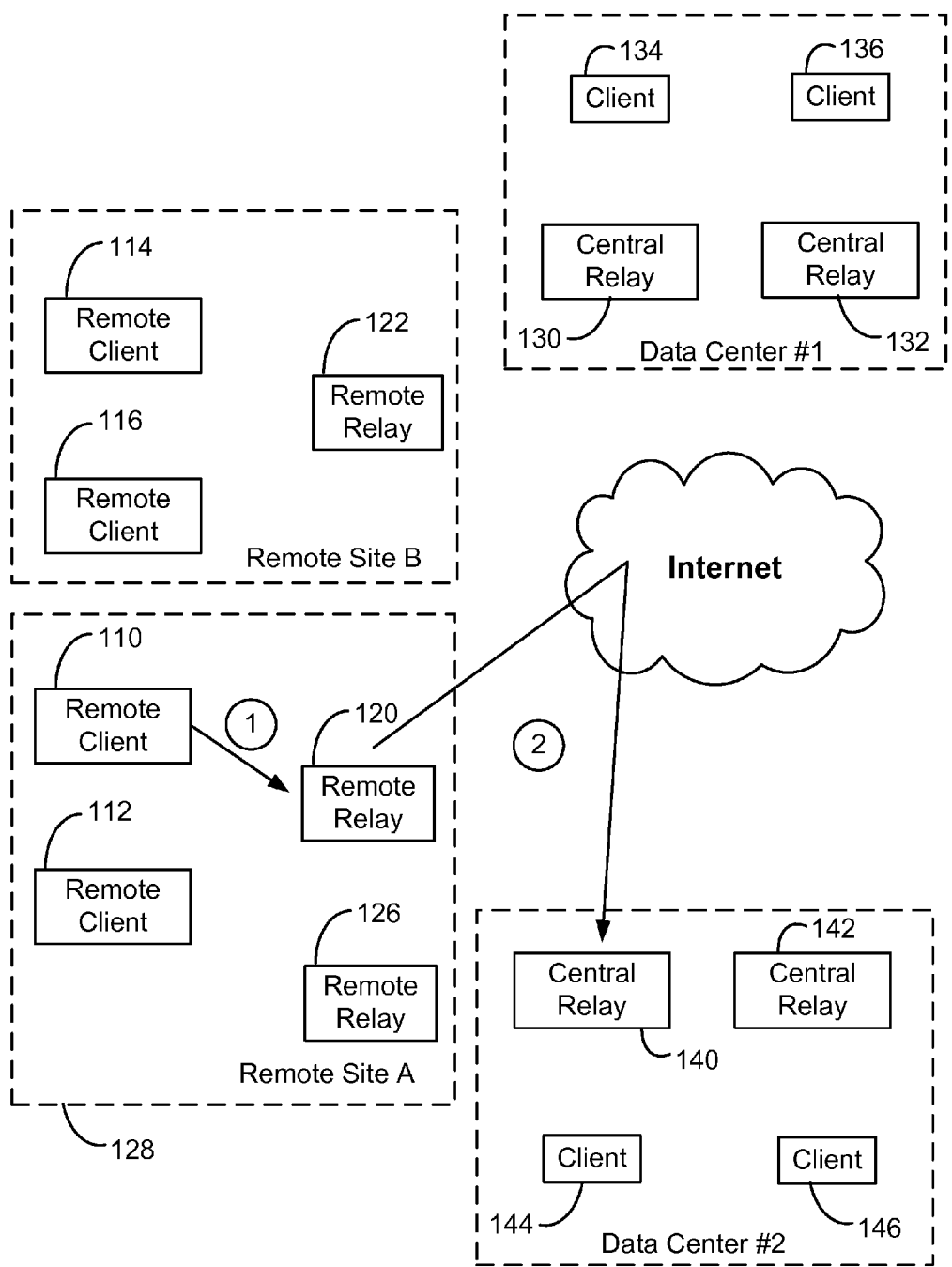
FIG. 10A is a simplified schematic diagram of remote sites and central data centers implementing a subscription request from a remote client according to an embodiment of the present invention.

FIG. 10A is a simplified schematic diagram of remote sites and central data centers implementing a subscription request from a remote client according to an embodiment of the present invention. Remote client 110 transmits a publication request to remote relay 120 (1), which, in turn, subscribes to a single central relay 140 (2).

Figure 10B:
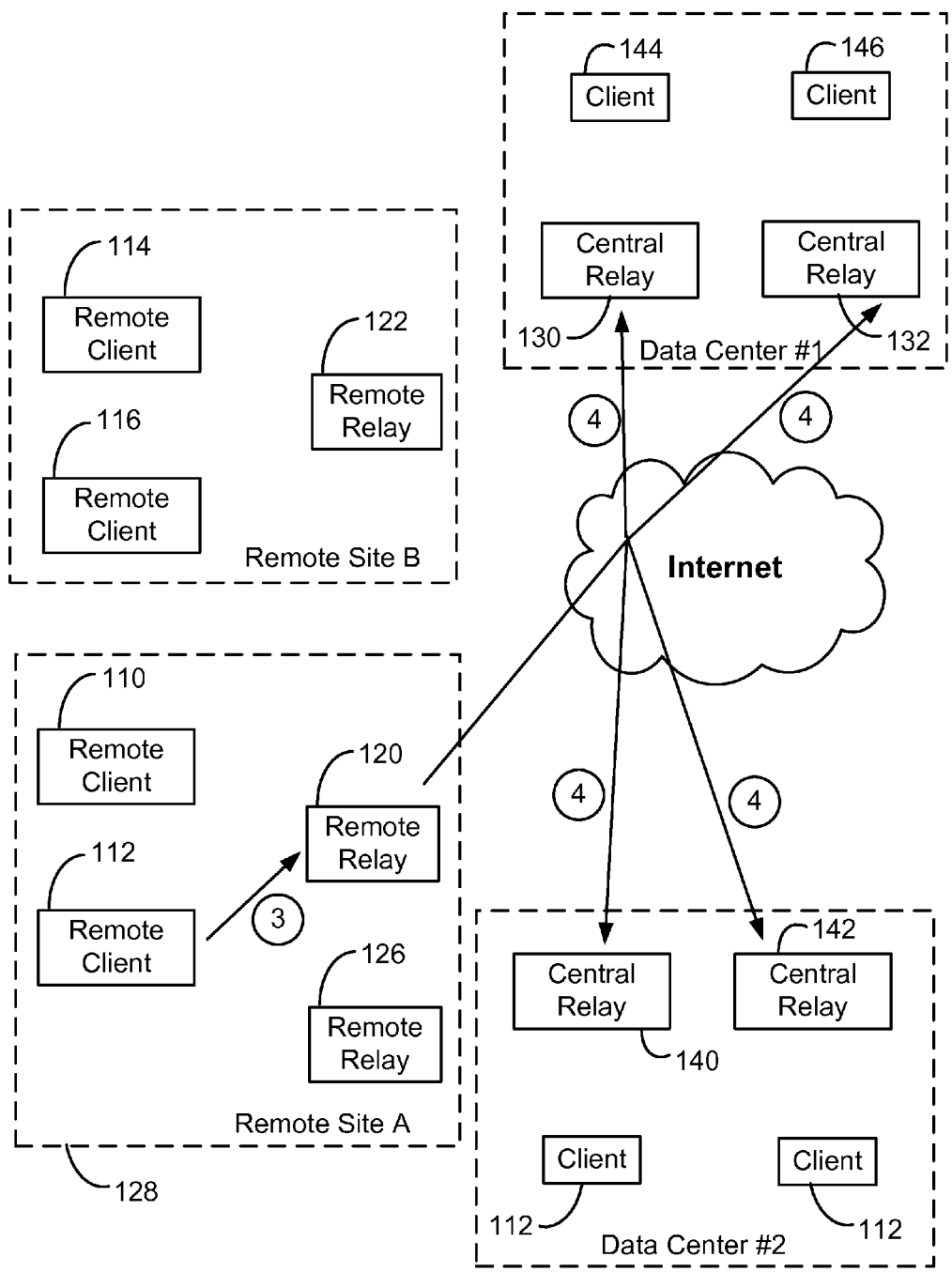
FIG. 10B is a simplified schematic diagram of remote sites and central data centers implementing a first stage of publication of a message from a remote client according to an embodiment of the present invention.
Figure 10C:
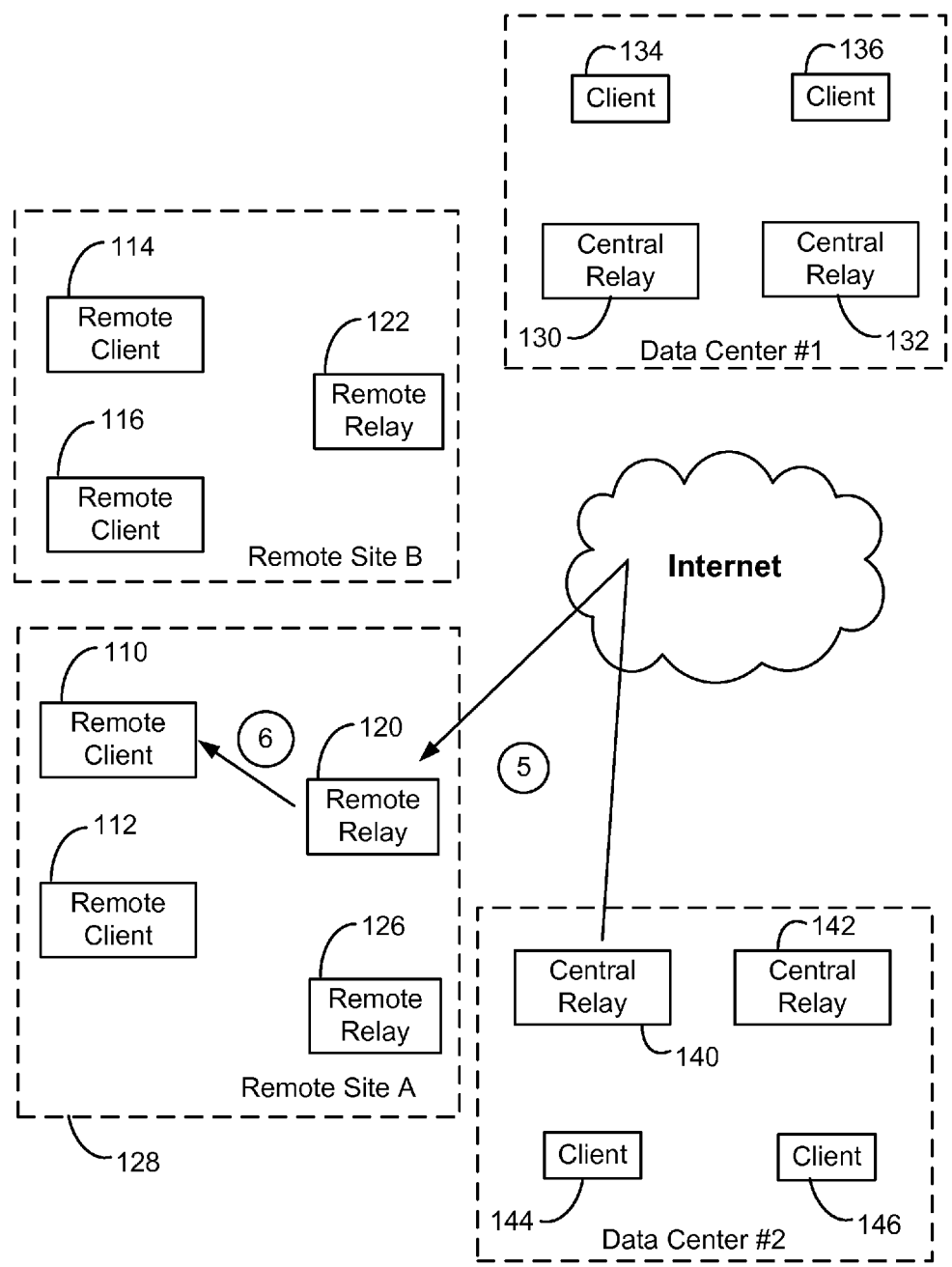
FIG. 10C is a simplified schematic diagram of remote sites and central data centers implementing a second stage of publication of a message from a remote client according to an embodiment of the present invention.

FIG. 10B is a simplified schematic diagram of remote sites and central data centers implementing a first stage of publication of a message from a remote client according to an embodiment of the present invention. Remote client 112 transmits a publication request or message to remote relay 120 (3), which publishes the publication message to all the central relays (4). FIG. 10C is a simplified schematic diagram of remote sites and central data centers implementing a second stage of publication of a message from a remote client according to an embodiment of the present invention. After receiving the publication message, central relay 140 determines that it has received a subscription request for the publication message and transmits the publication message to remote relay 120 (5), which, in turn, passes the message on to remote client 110 (6).

In this example, although remote relay 120 receives both the subscription request and the publication request, messages are transmitted to the central relays as illustrated in FIG. 10B. The inventors have determined that in many implementations, the extra messages transmitted in FIG. 10B and FIG. 10C are outnumbered by the reduction in the number of redundant subscriptions and the corresponding gains in system performance.

Figure 5:
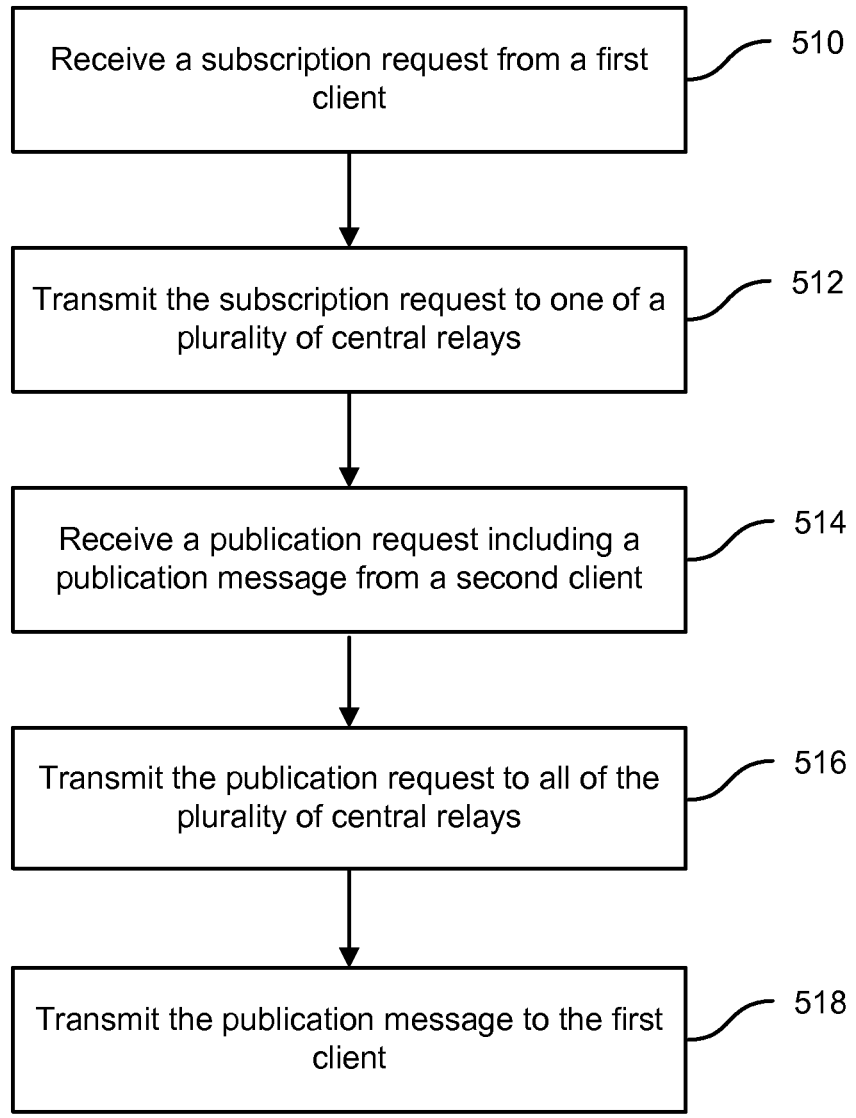
FIG. 5 is a simplified flowchart illustrating a method of subscribing from a remote client and publishing from a remote client according to an embodiment of the present invention.

FIG. 5 is a simplified flowchart illustrating a method of subscribing from a remote client and publishing from a remote client according to an embodiment of the present invention. The method includes receiving a subscription request from a first client (510). The subscription request is received at a remote relay and includes a target that will match a portion of a pattern in a message that the first client is interested in receiving. The method also includes transmitting the subscription request to one of a plurality of central relays (512). According to embodiments of the present invention, the subscription request is transmitted from the remote relay to a single central relay using a "subscribe to one, publish to all" technique described herein.

A publication request, also referred to as a publish request, is received from a second client (514). The publication request is received at a remote relay and includes a message with a pattern matching, in part or in whole, the target that is found in the subscription request. The message can be referred to as a publication message. This is a message that the first client is interested in receiving. The publication request is transmitted to all of the central relays (516). In turn, the remote relay that received the subscription request from the first client, transmits the publication message to the first client (518).

It should be appreciated that the specific steps illustrated in FIG. 5 provide a particular method of subscribing from a remote client and publishing from a remote client according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
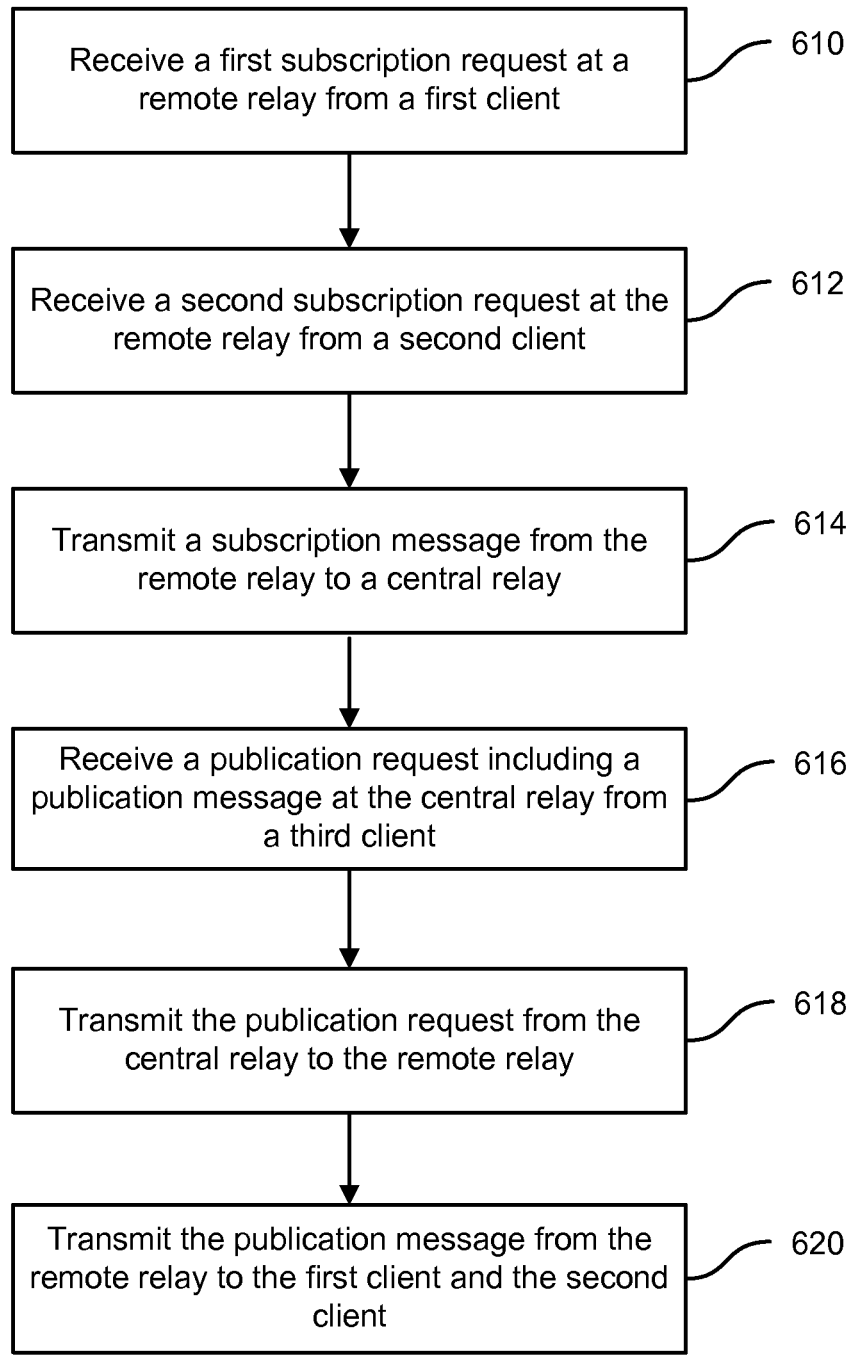
FIG. 6 is a simplified flowchart illustrating a method of subscribing from a remote client and publishing from a central client according to an embodiment of the present invention.

FIG. 6 is a simplified flowchart illustrating a method of subscribing from a remote client and publishing from a central client according to an embodiment of the present invention. The method includes receiving a first request, i.e., a subscription request, at a remote relay (610). The first request is received from a first client. As an example, the first client is a client that is located at a remote location with respect to a central data center. The method also includes receiving a second request at the remote relay from a second client (612). In this example, the second request is a subscription request and the second client is also located at a remote location with respect to the central data center. The remote relay transmits a subscription message to the a central relay (614). In the illustrated, embodiment, the subscription message combines the two subscription requests received from the first and second clients, saving network bandwidth in comparison to systems that send all subscription requests directly to the central relay. Depending on the characteristics of the subscription requests, no aggregation may be performed.

A message (i.e., a publication message) is received at the central relay from a third client (616). The third client can be a client co-located with the central relay, a client co-located with another central relay, or a remote client in communication with another remote relay. The publication message is transmitted from the central relay to the remote relay (618). The publication message can include other information in addition to the publication message, be a variant of the publication message, or the like. The publication message is then transmitted from the remote relay to the first client and the second client (620). A database of the subscription requests is utilized to transmit the message to the clients that have subscribed to the particular message type associated with the publication message.

In addition to the subscription requests received from remote clients, additional subscription requests can also be received from central clients. Thus, when publication requests are received, from either remote clients or central clients, the clients that have requested the particular message type associated with the publication request can receive their publication messages as requested.

It should be appreciated that the specific steps illustrated in FIG. 6 provide a particular method of subscribing from a remote client and publishing from a central client according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
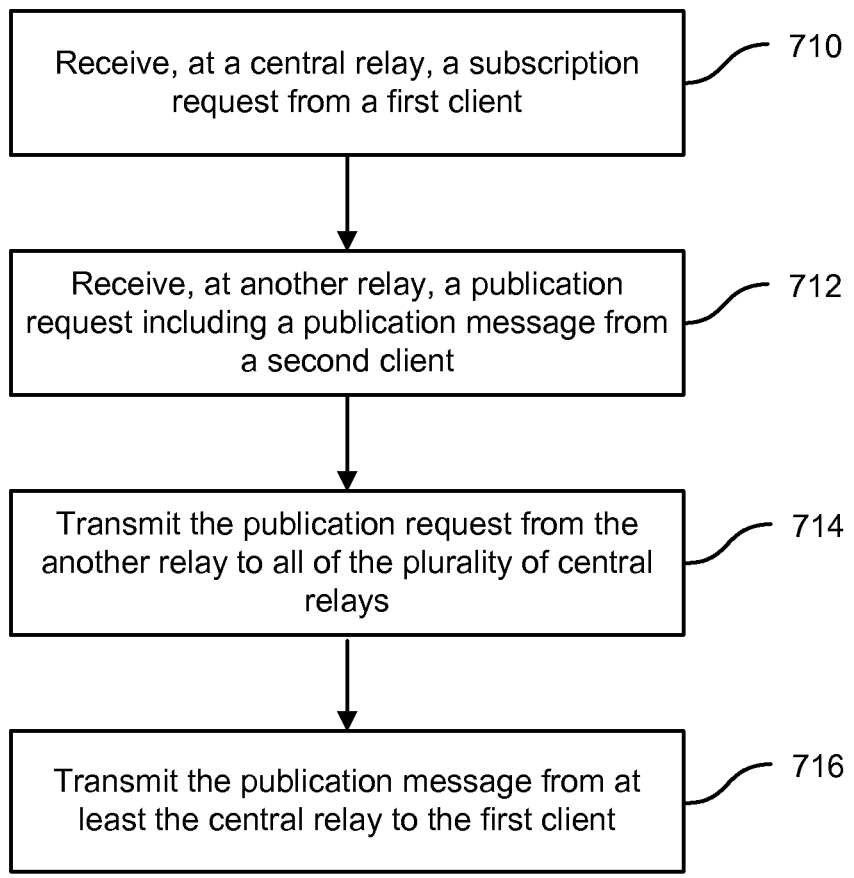
FIG. 7 is a simplified flowchart illustrating a method of subscribing from a central client and publishing from a remote client according to an embodiment of the present invention.

FIG. 7 is a simplified flowchart illustrating a method of subscribing from a central client and publishing from a remote client according to an embodiment of the present invention. The method includes receiving a subscription request at a central relay from a first client (710) and receiving, at another relay (referred to as an additional relay), a publication request including a publication message from a second client (712). In this example, the first client is a client that is co-located with the central relay (a central client) and the second client is a client that is located at a remote location with respect to the central relay (a remote client). In addition to the first client being co-located with the central relay, the first client could be directly connected to the central relay. The additional relay can be either a central relay or a remote relay depending on the particular implementation.

The publication request is transmitted from the additional relay to all of the plurality of central relays (714). In the embodiment in which the additional relay is a remote relay, the publication request is transmitted to all of the central relays in accordance with the "publish to all" method described herein. If the additional relay is a central relay, then the publication request is published to all the central relays with the exception of the additional relay, which has already received the publication request. The publication message is transmitted from the central relay to the first client (716). In addition, the publication message can be transmitted from the central relay to other clients or to remote relays. If a remote client has subscribed to the message type associated with the publication message, then transmitting the publication message to the client will involve transmitting the publication message to a remote relay and then on to the remote client and possibly other remote clients.

It should be appreciated that the specific steps illustrated in FIG. 7 provide a particular method of subscribing from a central client and publishing from a remote client according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
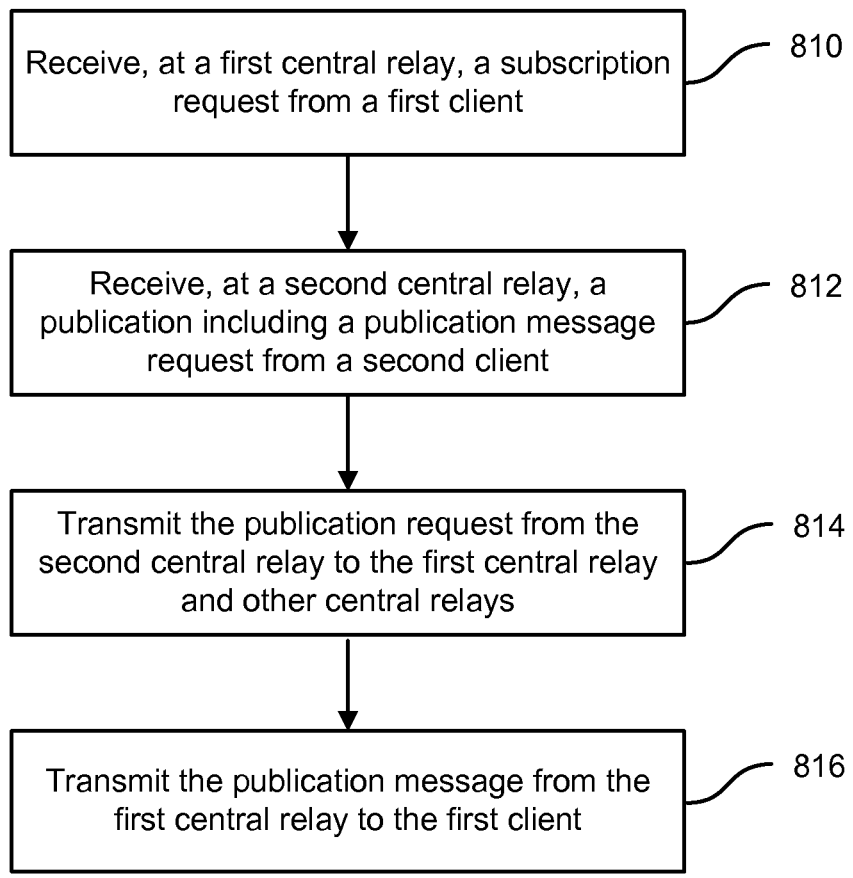
FIG. 8 is a simplified flowchart illustrating a method of subscribing from a central client and publishing from a central client according to an embodiment of the present invention.

FIG. 8 is a simplified flowchart illustrating a method of subscribing from a central client and publishing from a central client according to an embodiment of the present invention. The method includes receiving, at a first central relay, a subscribe request from a first client (810). The method also includes receiving, at a second central relay, a publication request from a second client (812). In this example, both the first client and the second client are central clients. A publication message associated with the publication request is transmitted from the second central relay to the first central relay and the other central relays other than the second central relay (814). The publication message is then transmitted from the first central relay to the first client (816).

It should be appreciated that the specific steps illustrated in FIG. 8 provide a particular method of subscribing from a central client and publishing from a central client according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
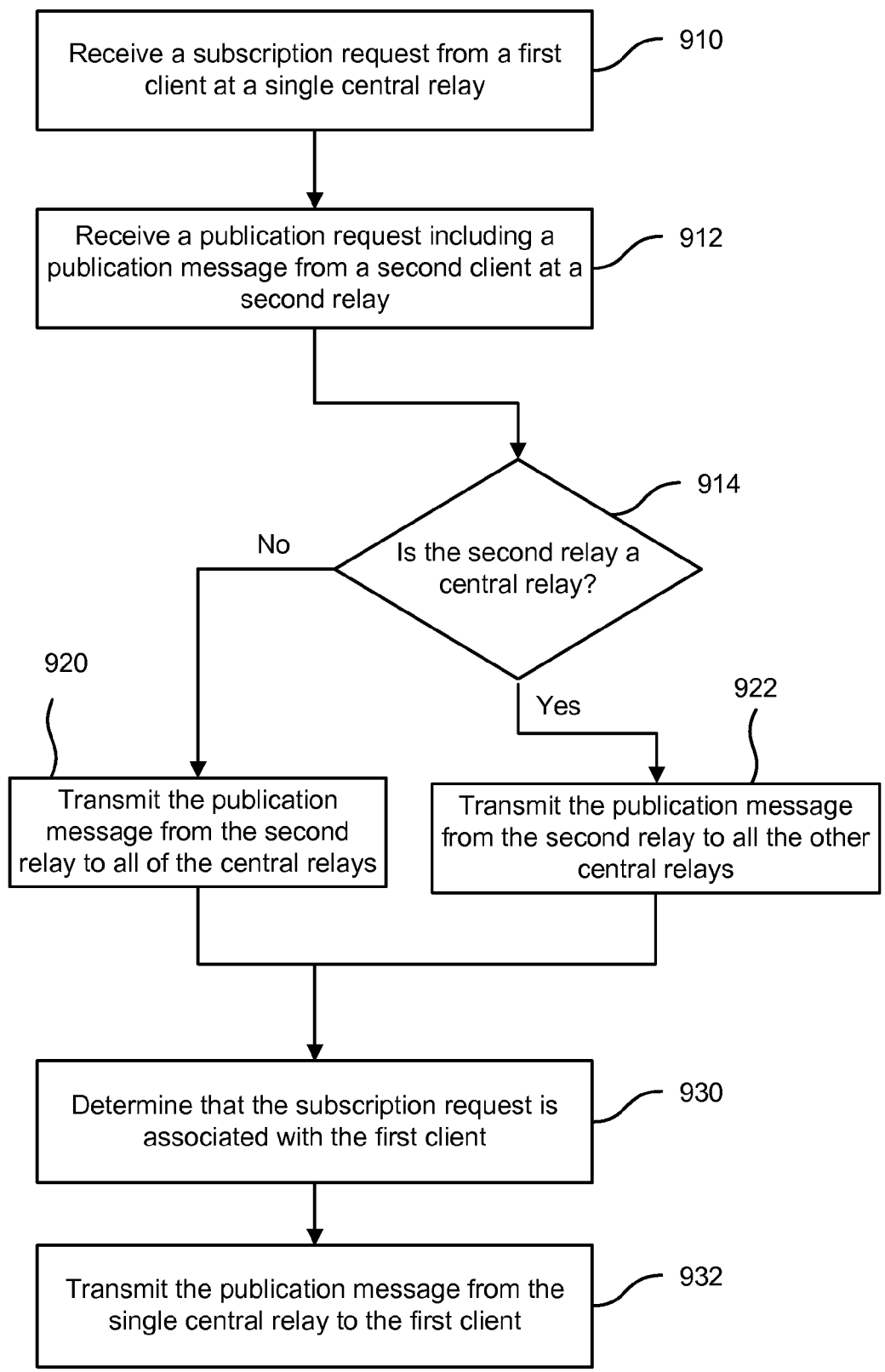
FIG. 9 is a simplified flowchart illustrating a method of subscribing from a first client and publishing from a second client according to an embodiment of the present invention.

FIG. 9 is a simplified flowchart illustrating a method of subscribing from a first client and publishing from a second client according to an embodiment of the present invention. In the embodiment illustrated in FIG. 9, the first client can be a remote client accessing the network through a remote relay or a central client co-located with a central relay in a data center. Additionally, the first client could be a client that is located remotely and still has a direct connection to the central relay in the data center, such as a legacy client present before implementation of the hierarchical structure described herein.

The method includes receiving a subscription request from the first client at a single central relay (910). The subscription request indicates a particular type of publication message in which the first client is interested in receiving. The subscription request can be transmitted from a remote client to a remote relay and then on to the single central relay. The subscription request can be transmitted from a central client or a client directly connected to the single central relay although remotely located. The method also includes receiving a publication request from a second client at a second relay (912). The publication request includes a publication message of the particular type specified by the first client. The second client can be a remote client accessing the network through a remote relay, a central client, or a client directed connected to the single central relay although remotely located.

A determination is made if the second relay is a central relay (914). If the second relay is a remote relay, then the publication message is transmitted from the second relay to all of the central relays (920). Additional information can be transmitted in addition to the publication message such as variants of the subscription request. If the second relay is a central relay, then the publication message is transmitted from the second relay to all of the central relays with the exception of the second relay (922), which has already received the publication message. Thus, the subscription request was submitted to a single central relay and the publication request, the publication message, or some combination thereof, has been transmitted to all the central relays.

A determination is made that the subscription request is associated with the first client (930) and the publication message is transmitted from the single central relay to the first client (932). It should be noted that other clients can also subscribe in addition to the first client. In this case, the publication message will be transmitted to these additional clients by the appropriate relay.

It should be appreciated that the specific steps illustrated in FIG. 9 provide a particular method of subscribing from a first client and publishing from a second client according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

In order to add additional reliability to the publish and subscribe system, a "publish on behalf of" functionality can be implemented in which the central relays are able to publish messages, not only to the remote relays and central clients from which they have received subscription requests, but to other central relays as well. Referring to FIG. 1B, if the connections between remote relay 122 and central relays 140 and 142 are down, then central relays 130 and/or 132 could be configured to retransmit the publication request after they receive it from remote relay 122. This retransmission would provide the message to central relays 140/142, despite the failure of the connection between them and remote relay 122. In turn, central relays 140/142 can then transmit the message to the remote relays/central clients that have subscribed to the message group. This feature could be implemented in response to inputs from system operators or could be implemented automatically based on a determination that connections have been lost between remote relay 122 and central relays 140/142. In case of a network outage, this backup system will enable messages to be published despite the presence of the network outage. This additional functionality of publishing on behalf of the remote relay that has lost connection to the original central relay is useful since the connections between the remote sites and the data centers are usually more problematic than the high grade connection between two data centers.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method of subscribing and publishing a publication message, the method comprising
    receiving a first subscription request at a remote relay from a first client, wherein the first subscription request includes a target;
    transmitting a subscription message from the remote relay to a single one of a plurality of central relays based on the first subscription request, wherein the transmitting includes the remote relay subscribing to the single one of a plurality of central relays on behalf of the first client and wherein the subscription message includes the target;
    entering a subscription, at the single one of a plurality of central relays, based on the received subscription message and not forwarding the received subscription message;
    receiving a publication message at the remote relay from a second client, wherein the publication message includes a pattern;
    transmitting the publication message to each of the central relays of the plurality of central relays,
    determining, by the remote relay, that the target from the subscription request matches at least a portion of the pattern in the publication message; and
    transmitting at least a portion of the publication message from the remote relay to the first client.

2. The method of claim 1 wherein the pattern is a string of a first length and the target is a string of a second length less than the first length.

3. The method of claim 1 wherein the first client is a remote client.

4. The method of claim 1, further comprising receiving a second subscription request at a remote relay from a third client, wherein the second subscription request includes the target, wherein the third client is a remote client.

5. The method of claim 4 wherein the first client and the third client are co-located with the remote relay.

6. A computer-implemented method of publishing a publication message, the method comprising:
    receiving a subscription request at a non-central relay from a client, wherein the subscription request includes a target;
    transmitting a subscription message from the non-central relay to a single one of a plurality of central relays based on the subscription request, wherein the transmitting includes the non-central relay subscribing to the single one of a plurality of central relays on behalf of the client and wherein the subscription message includes the target;
    entering a subscription, at the single one of a plurality of central relays, based on the received subscription message and not forwarding the received subscription message;
    receiving, at the non-central relay, the publication message from another client, wherein the publication message includes a pattern;
    determining that a target of the subscription request received from the client matches at least a portion of the pattern;
    providing at least a portion of the publication message from the non-central relay to all of a plurality of central relays; and
    providing at least a portion of the publication message from the non-central relay to the the client.

7. The method of claim 6 wherein the non-central relay comprises a remote relay.

8. The method of claim 6 wherein the publication message is included in a publication request received by the non-central relay.

9. A computer-implemented method for publishing a publication message, the method comprising:
    receiving, at a first one of a plurality of central relays, a subscription request from a first client, wherein the subscription request includes a target;
    entering a subscription, at the first one of a plurality of central relays, based on the received subscription request and not forwarding the received subscription request;
    receiving, at a second one of the plurality of central relays, a publication request from a second client, the publication request including the publication message, wherein the publication message includes a pattern;
    determining that the target is correlated to the pattern;
    transmitting the publication message from the second one of the plurality of central relays to the first one of the plurality of central relays and to other central relays of the plurality of central relays;
    determining that a connection between the first one of the plurality of central relays and the second one of the plurality of central relays is available; and
    transmitting the publication message from the first one of the plurality of central relays to the first client.

10. The method of claim 9 wherein the first client comprises a client collocated with the first one of the plurality of central relays.

11. The method of claim 9 wherein the first client comprises a remote relay.

12. The method of claim 9 wherein the second one of the plurality central relays comprises the first one of the plurality of central relays.

13. The method of claim 9 wherein transmitting the publication message comprises transmitting a portion of the publication request.

14. The method of claim 9, further comprising:
    determining that a connection between the first one of the plurality of central relays and the second one of the plurality of central relays is not available; and
    transmitting the publication message from the second one of the central relays to the first client.

15. A method for routing messages in a publish/subscribe network, the method comprising:
    receiving a subscription request at a second remote relay from a client, wherein the subscription request includes a target;
    transmitting a subscription message from the second remote relay to a first central relay of a plurality of central relays based on the subscription request, wherein the transmitting includes the second remote relay subscribing to the first central relay on behalf of the first client and wherein the subscription message includes the target;
    entering a subscription, at the first central relay, based on the received subscription message and not forwarding the received subscription message;
    receiving, at the first central relay of a plurality of central relays, a publication message from a first remote relay;
    determining, by the first central relay, that a second central relay of the plurality of central relays, did not receive the publication message;
    forwarding, by the first central relay, the publication message that was received from the first remote relay to the second central relay on behalf of the first remote relay;
    determining, by the first central relay, that the publication message received from the first remote relay matches at least a portion of the subscription message received from the second remote relay; and
    providing the publication message from the second remote relay to the client.

16. The method of claim 15, further comprising storing the publication message in a storage device in the first central relay.

17. The method of claim 15, further comprising receiving, at the first central relay, another publication message from the second central relay that was forward on from the second remote relay.

* * * * *